(12) United States Patent
Ording

(10) Patent No.: US 10,338,789 B2
(45) Date of Patent: Jul. 2, 2019

(54) OPERATION OF A COMPUTER WITH TOUCH SCREEN INTERFACE

(71) Applicant: Apple Inc., Cupertino, CA (US)

(72) Inventor: Bas Ording, San Francisco, CA (US)

(73) Assignee: Apple Inc., Cupertino, CA (US)

(*) Notice: Subject to any disclaimer, the term of this patent is extended or adjusted under 35 U.S.C. 154(b) by 377 days.

(21) Appl. No.: 14/990,556

(22) Filed: Jan. 7, 2016

(65) Prior Publication Data

US 2016/0117084 A1  Apr. 28, 2016

Related U.S. Application Data

(63) Continuation of application No. 11/696,701, filed on Apr. 4, 2007, now Pat. No. 9,239,677, which is a
(Continued)

(51) Int. Cl.
*G06F 3/048* (2013.01)
*G06F 3/0484* (2013.01)
*G06F 3/0488* (2013.01)
*G06F 3/041* (2006.01)
*G06F 3/0482* (2013.01)
*G06F 3/023* (2006.01)

(52) U.S. Cl.
CPC ........ *G06F 3/04842* (2013.01); *G06F 3/0236* (2013.01); *G06F 3/0414* (2013.01); *G06F 3/0482* (2013.01); *G06F 3/04883* (2013.01); *G06F 3/04886* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS 3,333,160 A   7/1967 Gorski
3,541,541 A   11/1970 Engelbart
(Continued)

FOREIGN PATENT DOCUMENTS

CA   1243096 A1   10/1988
CN   101131619 A   2/2008
(Continued)

OTHER PUBLICATIONS

Non-Final Office Action received for U.S. Appl. No. 11/830,801 dated Mar. 21, 2011, 11 pages.
(Continued)

*Primary Examiner* — Hua Lu
(74) *Attorney, Agent, or Firm* — Dentons US LLP

(57) ABSTRACT

A touch screen computer executes an application. A method of operating the touch screen computer in response to a user is provided. A virtual input device is provided on the touch screen. The virtual input device comprises a plurality of virtual keys. It is detected that a user has touched the touch screen to nominally activate at least one virtual key, and a behavior of the user with respect to touch is determined. The determined behavior is processed and a predetermined characteristic is associated with the nominally-activated at least one virtual key. A reaction to the nominal activation is determined based at least in part on a result of processing the determined behavior.

30 Claims, 7 Drawing Sheets

Related U.S. Application Data continuation of application No. 11/228,700, filed on Sep. 16, 2005, now Pat. No. 7,614,008, which is a continuation-in-part of application No. 10/903,964, filed on Jul. 30, 2004, now Pat. No. 8,479,122.

(56) References Cited

U.S. PATENT DOCUMENTS

| | | |
|---|---|---|
| 3,662,105 A | 5/1972 | Hurst et al. |
| 3,798,370 A | 3/1974 | Hurst |
| 4,246,452 A | 1/1981 | Chandler |
| 4,550,221 A | 10/1985 | Mabusth |
| 4,672,364 A | 6/1987 | Lucas |
| 4,672,558 A | 6/1987 | Beckes et al. |
| 4,692,809 A | 9/1987 | Beining et al. |
| 4,695,827 A | 9/1987 | Beining et al. |
| 4,733,222 A | 3/1988 | Evans |
| 4,734,685 A | 3/1988 | Watanabe |
| 4,736,191 A * | 4/1988 | Matzke ............... G06F 3/0213 341/20 |
| 4,746,770 A | 5/1988 | McAvinney |
| 4,771,276 A | 9/1988 | Parks |
| 4,788,384 A | 11/1988 | Bruere-Dawson et al. |
| 4,806,846 A | 2/1989 | Kerber |
| 4,898,555 A | 2/1990 | Sampson |
| 4,968,877 A | 11/1990 | McAvinney et al. |
| 5,003,519 A | 3/1991 | Noirjean |
| 5,017,030 A | 5/1991 | Crews |
| 5,038,401 A | 8/1991 | Inotsume |
| 5,053,758 A | 10/1991 | Cornett et al. |
| 5,178,477 A | 1/1993 | Gambaro |
| 5,189,403 A | 2/1993 | Franz et al. |
| 5,194,862 A | 3/1993 | Edwards |
| 5,224,861 A | 7/1993 | Glass et al. |
| 5,241,308 A | 8/1993 | Young |
| 5,252,951 A | 10/1993 | Tannenbaum et al. |
| 5,272,470 A * | 12/1993 | Zetts ................... G06F 3/04883 178/19.01 |
| 5,281,966 A | 1/1994 | Walsh |
| 5,297,041 A | 3/1994 | Kushler et al. |
| 5,305,017 A | 4/1994 | Gerpheide |
| 5,345,543 A | 9/1994 | Capps et al. |
| 5,374,787 A | 12/1994 | Miller et al. |
| 5,376,948 A | 12/1994 | Roberts |
| 5,398,310 A | 3/1995 | Tchao et al. |
| 5,442,742 A | 8/1995 | Greyson et al. |
| 5,463,388 A | 10/1995 | Boie et al. |
| 5,463,696 A | 10/1995 | Beernink et al. |
| 5,483,261 A | 1/1996 | Yasutake |
| 5,488,204 A | 1/1996 | Mead et al. |
| 5,495,077 A | 2/1996 | Miller et al. |
| 5,513,309 A | 4/1996 | Meier et al. |
| 5,523,775 A | 6/1996 | Capps |
| 5,530,455 A | 6/1996 | Gillick et al. |
| 5,543,590 A | 8/1996 | Gillespie et al. |
| 5,543,591 A | 8/1996 | Gillespie et al. |
| 5,563,632 A | 10/1996 | Roberts |
| 5,563,996 A | 10/1996 | Tchao |
| 5,565,658 A | 10/1996 | Gerpheide et al. |
| 5,565,894 A | 10/1996 | Bates et al. |
| 5,579,036 A | 11/1996 | Yates, IV |
| 5,581,681 A | 12/1996 | Tchao et al. |
| 5,583,946 A | 12/1996 | Gourdol |
| 5,590,219 A | 12/1996 | Gourdol |
| 5,592,566 A | 1/1997 | Pagallo et al. |
| 5,594,810 A | 1/1997 | Gourdol |
| 5,596,694 A | 1/1997 | Capps |
| 5,612,719 A | 3/1997 | Beernink et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| 5,666,113 A | 9/1997 | Logan |
| 5,666,502 A | 9/1997 | Capps |
| 5,666,552 A | 9/1997 | Greyson et al. |
| 5,675,361 A | 10/1997 | Santilli |
| 5,677,710 A | 10/1997 | Thompson-Rohrlich |
| 5,689,253 A | 11/1997 | Hargreaves et al. |
| 5,689,667 A | 11/1997 | Kurtenbach |
| 5,710,844 A | 1/1998 | Capps et al. |
| 5,729,250 A | 3/1998 | Bishop et al. |
| 5,730,165 A | 3/1998 | Philipp |
| 5,736,974 A | 4/1998 | Selker |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,746,818 A | 5/1998 | Yatake |
| 5,748,269 A | 5/1998 | Harris et al. |
| 5,748,512 A | 5/1998 | Vargas |
| 5,764,222 A | 6/1998 | Shieh |
| 5,764,818 A | 6/1998 | Capps et al. |
| 5,767,457 A | 6/1998 | Gerpheide et al. |
| 5,767,842 A | 6/1998 | Korth |
| 5,790,104 A | 8/1998 | Shieh |
| 5,790,107 A | 8/1998 | Kasser et al. |
| 5,798,760 A | 8/1998 | Vayda et al. |
| 5,801,941 A | 9/1998 | Bertram |
| 5,802,516 A | 9/1998 | Shwarts et al. |
| 5,805,167 A | 9/1998 | Van Cruyningen |
| 5,808,567 A | 9/1998 | McCloud |
| 5,809,267 A | 9/1998 | Moran et al. |
| 5,818,451 A | 10/1998 | Bertram et al. |
| 5,821,690 A | 10/1998 | Martens et al. |
| 5,821,930 A | 10/1998 | Hansen |
| 5,823,782 A | 10/1998 | Marcus et al. |
| 5,825,308 A | 10/1998 | Rosenberg |
| 5,825,351 A | 10/1998 | Tam |
| 5,825,352 A | 10/1998 | Bisset et al. |
| 5,854,625 A | 12/1998 | Frisch et al. |
| 5,856,822 A * | 1/1999 | Du ..................... G06F 3/03547 345/157 |
| 5,874,948 A | 2/1999 | Shieh |
| 5,877,751 A | 3/1999 | Kanemitsu et al. |
| 5,880,411 A * | 3/1999 | Gillespie ............ G06F 3/03547 178/18.01 |
| 5,898,434 A | 4/1999 | Small et al. |
| 5,920,309 A | 7/1999 | Bisset et al. |
| 5,923,319 A | 7/1999 | Bishop et al. |
| 5,933,134 A | 8/1999 | Shieh |
| 5,943,044 A | 8/1999 | Martinelli et al. |
| 5,963,671 A | 10/1999 | Comerford et al. |
| 5,982,357 A * | 11/1999 | Burgett ................... G06F 3/023 341/22 |
| 5,999,895 A | 12/1999 | Forest |
| 6,002,389 A | 12/1999 | Kasser |
| 6,002,808 A | 12/1999 | Freeman |
| 6,020,881 A | 2/2000 | Naughton et al. |
| 6,028,271 A * | 2/2000 | Gillespie ............ G06F 3/03547 178/18.01 |
| 6,031,524 A | 2/2000 | Kunert |
| 6,037,882 A | 3/2000 | Levy |
| 6,040,824 A | 3/2000 | Maekawa et al. |
| 6,049,326 A | 4/2000 | Beyda et al. |
| 6,050,825 A | 4/2000 | Nichol et al. |
| 6,052,339 A | 4/2000 | Frenkel et al. |
| 6,054,984 A * | 4/2000 | Alexander ............ G01R 13/20 345/440 |
| 6,072,494 A | 6/2000 | Nguyen |
| 6,073,036 A | 6/2000 | Heikkinen et al. |
| 6,084,576 A | 7/2000 | Leu et al. |
| 6,088,019 A | 7/2000 | Rosenberg |
| 6,094,197 A | 7/2000 | Buxton et al. |
| 6,104,384 A | 8/2000 | Moon et al. |
| 6,107,997 A | 8/2000 | Ure |
| 6,128,003 A | 10/2000 | Smith et al. |
| 6,131,299 A | 10/2000 | Raab et al. |
| 6,135,958 A | 10/2000 | Mikula-Curtis et al. |
| 6,144,380 A | 11/2000 | Shwarts et al. |
| 6,169,538 B1 | 1/2001 | Nowlan et al. |
| 6,188,391 B1 | 2/2001 | Seely et al. |
| 6,198,515 B1 | 3/2001 | Cole |

(56) References Cited

U.S. PATENT DOCUMENTS

| | | | |
|---|---|---|---|
| 6,208,329 | B1 | 3/2001 | Ballare |
| 6,222,465 | B1 | 4/2001 | Kumar et al. |
| 6,239,790 | B1* | 5/2001 | Martinelli ............ G06F 3/03547 |
| | | | 178/18.01 |
| 6,243,071 | B1 | 6/2001 | Shwarts et al. |
| 6,246,862 | B1 | 6/2001 | Grivas et al. |
| 6,249,606 | B1 | 6/2001 | Kiraly et al. |
| 6,259,436 | B1 | 7/2001 | Moon et al. |
| 6,271,835 | B1 | 8/2001 | Hoeksma |
| 6,288,707 | B1 | 9/2001 | Philipp |
| 6,289,326 | B1 | 9/2001 | LaFleur |
| 6,292,178 | B1 | 9/2001 | Bernstein et al. |
| 6,292,179 | B1 | 9/2001 | Lee |
| 6,295,052 | B1 | 9/2001 | Kato et al. |
| 6,310,610 | B1 | 10/2001 | Beaton et al. |
| 6,323,846 | B1 | 11/2001 | Westerman et al. |
| 6,323,849 | B1 | 11/2001 | He et al. |
| 6,347,290 | B1 | 2/2002 | Bartlett |
| 6,359,572 | B1 | 3/2002 | Vale |
| 6,377,009 | B1 | 4/2002 | Philipp |
| 6,380,931 | B1 | 4/2002 | Gillespie et al. |
| 6,411,287 | B1 | 6/2002 | Scharff et al. |
| 6,414,671 | B1 | 7/2002 | Gillespie et al. |
| 6,421,234 | B1 | 7/2002 | Ricks et al. |
| 6,424,338 | B1* | 7/2002 | Anderson ............. G06F 3/0213 |
| | | | 178/18.01 |
| 6,429,846 | B2 | 8/2002 | Rosenberg et al. |
| 6,448,977 | B1 | 9/2002 | Braun et al. |
| 6,452,514 | B1 | 9/2002 | Philipp |
| 6,456,952 | B1 | 9/2002 | Nathan |
| 6,457,355 | B1 | 10/2002 | Philipp |
| 6,466,036 | B1 | 10/2002 | Philipp |
| 6,469,722 | B1 | 10/2002 | Kinoe et al. |
| 6,515,669 | B1 | 2/2003 | Mohri |
| 6,525,749 | B1 | 2/2003 | Moran et al. |
| 6,535,200 | B2 | 3/2003 | Philipp |
| 6,543,684 | B1 | 4/2003 | White et al. |
| 6,543,947 | B2 | 4/2003 | Lee |
| 6,563,487 | B2 | 5/2003 | Martin et al. |
| 6,570,557 | B1 | 5/2003 | Westerman et al. |
| 6,573,844 | B1 | 6/2003 | Venolia et al. |
| 6,593,916 | B1 | 7/2003 | Aroyan |
| 6,597,345 | B2 | 7/2003 | Hirshberg |
| 6,610,936 | B2 | 8/2003 | Gillespie et al. |
| 6,624,833 | B1 | 9/2003 | Kumar et al. |
| 6,639,577 | B2 | 10/2003 | Eberhard |
| 6,650,319 | B1 | 11/2003 | Hurst et al. |
| 6,654,733 | B1 | 11/2003 | Goodman et al. |
| 6,658,994 | B1 | 12/2003 | McMillan |
| 6,670,894 | B2 | 12/2003 | Mehring |
| 6,677,932 | B1 | 1/2004 | Westerman |
| 6,677,934 | B1 | 1/2004 | Blanchard |
| 6,724,366 | B2 | 4/2004 | Crawford |
| 6,757,002 | B1 | 6/2004 | Oross et al. |
| 6,795,059 | B2 | 9/2004 | Endo |
| 6,803,905 | B1 | 10/2004 | Capps et al. |
| 6,803,906 | B1 | 10/2004 | Morrison et al. |
| 6,822,635 | B2 | 11/2004 | Shahoian et al. |
| 6,842,672 | B1 | 1/2005 | Straub et al. |
| 6,856,259 | B1 | 2/2005 | Sharp |
| 6,857,800 | B2 | 2/2005 | Zhang et al. |
| 6,888,536 | B2 | 5/2005 | Westerman et al. |
| 6,900,795 | B1 | 5/2005 | Knight, III et al. |
| 6,926,609 | B2 | 8/2005 | Martin |
| 6,927,761 | B2 | 8/2005 | Badaye et al. |
| 6,942,571 | B1 | 9/2005 | McAllister et al. |
| 6,954,899 | B1* | 10/2005 | Anderson ............... G06F 3/016 |
| | | | 345/157 |
| 6,965,375 | B1 | 11/2005 | Gettemy et al. |
| 6,972,401 | B2 | 12/2005 | Akitt et al. |
| 6,975,304 | B1 | 12/2005 | Hawkins et al. |
| 6,977,666 | B1 | 12/2005 | Hedrick |
| 6,985,801 | B1 | 1/2006 | Straub et al. |
| 6,992,659 | B2 | 1/2006 | Gettemy |
| 7,030,863 | B2 | 4/2006 | Longe et al. |
| 7,031,228 | B2 | 4/2006 | Born et al. |
| 7,038,659 | B2 | 5/2006 | Rajkowski |
| 7,057,607 | B2 | 6/2006 | Mayoraz et al. |
| 7,075,512 | B1 | 7/2006 | Fabre et al. |
| 7,098,896 | B2 | 8/2006 | Kushler et al. |
| 7,129,416 | B1 | 10/2006 | Steinfeld et al. |
| 7,194,699 | B2 | 3/2007 | Thomson et al. |
| RE40,153 | E | 3/2008 | Westerman et al. |
| 7,443,316 | B2 | 10/2008 | Lim |
| 7,477,240 | B2 | 1/2009 | Yanagisawa |
| 7,511,702 | B2 | 3/2009 | Hotelling |
| 7,526,738 | B2 | 4/2009 | Ording et al. |
| 7,538,760 | B2 | 5/2009 | Hotelling et al. |
| RE40,993 | E | 11/2009 | Westerman |
| 7,614,008 | B2 | 11/2009 | Ording |
| 7,619,618 | B2 | 11/2009 | Westerman et al. |
| 7,656,393 | B2 | 2/2010 | King et al. |
| 7,656,394 | B2 | 2/2010 | Westerman et al. |
| 7,663,607 | B2 | 2/2010 | Hotelling et al. |
| 7,683,888 | B1 | 3/2010 | Kennedy |
| 7,683,889 | B2* | 3/2010 | Rimas Ribikauskas ..................... |
| | | | G06F 3/0414 |
| | | | 178/18.01 |
| 7,694,231 | B2 | 4/2010 | Kocienda et al. |
| 7,706,616 | B2 | 4/2010 | Kristensson et al. |
| 7,760,187 | B2 | 7/2010 | Kennedy |
| 7,764,274 | B2 | 7/2010 | Westerman et al. |
| 7,808,479 | B1 | 10/2010 | Hotelling et al. |
| 7,898,529 | B2 | 3/2011 | Fitzmaurice et al. |
| 7,978,181 | B2 | 7/2011 | Westerman |
| 8,279,180 | B2 | 10/2012 | Hotelling et al. |
| 8,314,775 | B2 | 11/2012 | Westerman et al. |
| 8,384,675 | B2 | 2/2013 | Westerman et al. |
| 8,479,122 | B2 | 7/2013 | Hotelling et al. |
| 8,806,362 | B2 | 8/2014 | Ording et al. |
| 9,239,677 | B2 | 1/2016 | Ording |
| 2002/0015024 | A1 | 2/2002 | Westerman et al. |
| 2002/0051018 | A1 | 5/2002 | Yeh |
| 2002/0080123 | A1* | 6/2002 | Kennedy ................ G06F 3/041 |
| | | | 345/173 |
| 2002/0097229 | A1* | 7/2002 | Rose ..................... G06F 1/1626 |
| | | | 345/173 |
| 2002/0118848 | A1 | 8/2002 | Karpenstein |
| 2002/0135615 | A1 | 9/2002 | Lang |
| 2002/0140679 | A1 | 10/2002 | Wen |
| 2002/0140680 | A1* | 10/2002 | Lu ......................... G06F 1/1626 |
| | | | 345/169 |
| 2002/0167545 | A1 | 11/2002 | Kang et al. |
| 2003/0006974 | A1 | 1/2003 | Clough et al. |
| 2003/0014239 | A1 | 1/2003 | Ichbiah et al. |
| 2003/0063073 | A1 | 4/2003 | Geaghan et al. |
| 2003/0076301 | A1 | 4/2003 | Tsuk et al. |
| 2003/0076303 | A1 | 4/2003 | Huppi |
| 2003/0076306 | A1 | 4/2003 | Zadesky et al. |
| 2003/0095095 | A1 | 5/2003 | Pihlaja |
| 2003/0095096 | A1 | 5/2003 | Robbin et al. |
| 2003/0098858 | A1 | 5/2003 | Perski et al. |
| 2003/0132950 | A1 | 7/2003 | Surucu et al. |
| 2003/0134578 | A1 | 7/2003 | Strasbaugh et al. |
| 2003/0193481 | A1 | 10/2003 | Sokolsky |
| 2003/0197736 | A1 | 10/2003 | Murphy |
| 2003/0206202 | A1 | 11/2003 | Moriya |
| 2003/0234768 | A1 | 12/2003 | Rekimoto et al. |
| 2004/0009788 | A1 | 1/2004 | Mantyjarvi et al. |
| 2004/0021644 | A1 | 2/2004 | Enomoto |
| 2004/0053661 | A1 | 3/2004 | Jones et al. |
| 2004/0108995 | A1* | 6/2004 | Hoshino ................ F16M 11/10 |
| | | | 345/173 |
| 2004/0134238 | A1 | 7/2004 | Buckroyd et al. |
| 2004/0135774 | A1* | 7/2004 | La Monica ........... G06F 3/0233 |
| | | | 345/174 |
| 2004/0136564 | A1 | 7/2004 | Roeber et al. |
| 2004/0140956 | A1 | 7/2004 | Kushler et al. |
| 2004/0150631 | A1* | 8/2004 | Fleck .................. G06F 3/03545 |
| | | | 345/179 |
| 2004/0160419 | A1* | 8/2004 | Padgitt ................ G06F 3/04842 |
| | | | 345/173 |
| 2004/0165924 | A1 | 8/2004 | Griffin |

(56) References Cited

U.S. PATENT DOCUMENTS

| | | |
|---|---|---|
| 2004/0178994 A1 | 9/2004 | Kairls, Jr. |
| 2004/0181749 A1 | 9/2004 | Chellapilla et al. |
| 2004/0183833 A1 | 9/2004 | Chua |
| 2004/0218963 A1 | 11/2004 | Van Diepen et al. |
| 2004/0263484 A1 | 12/2004 | Mantysalo et al. |
| 2005/0012723 A1 | 1/2005 | Pallakoff |
| 2005/0024341 A1 | 2/2005 | Gillespie et al. |
| 2005/0052425 A1 | 3/2005 | Zadesky et al. |
| 2005/0104867 A1 | 5/2005 | Westerman et al. |
| 2005/0110768 A1 | 5/2005 | Marriott et al. |
| 2005/0169527 A1* | 8/2005 | Longe .................. G06F 3/0237 382/177 |
| 2005/0190970 A1 | 9/2005 | Griffin |
| 2005/0253816 A1 | 11/2005 | Himberg et al. |
| 2005/0253818 A1 | 11/2005 | Nettamo |
| 2005/0289476 A1* | 12/2005 | Tokkonen ............... G06F 3/038 715/769 |
| 2006/0007174 A1 | 1/2006 | Shen |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0052885 A1 | 3/2006 | Kong |
| 2006/0053387 A1 | 3/2006 | Ording |
| 2006/0066582 A1 | 3/2006 | Lyon et al. |
| 2006/0066590 A1 | 3/2006 | Ozawa et al. |
| 2006/0085757 A1 | 4/2006 | Andre et al. |
| 2006/0085767 A1 | 4/2006 | Hinckley et al. |
| 2006/0097991 A1 | 5/2006 | Hotelling et al. |
| 2006/0132455 A1* | 6/2006 | Rimas-Ribikauskas ..................... G06F 3/0414 345/173 |
| 2006/0161846 A1 | 7/2006 | Van Leeuwen |
| 2006/0181519 A1 | 8/2006 | Vernier et al. |
| 2006/0197753 A1 | 9/2006 | Hotelling |
| 2006/0238522 A1 | 10/2006 | Westerman et al. |
| 2006/0242607 A1 | 10/2006 | Hudson |
| 2006/0253793 A1 | 11/2006 | Zhai et al. |
| 2006/0274051 A1 | 12/2006 | Longe et al. |
| 2007/0061754 A1 | 3/2007 | Ardhanari et al. |
| 2007/0100890 A1 | 5/2007 | Kim |
| 2007/0139382 A1 | 6/2007 | Kotipalli |
| 2007/0174788 A1 | 7/2007 | Ording |
| 2008/0024459 A1 | 1/2008 | Poupyrev et al. |
| 2008/0098331 A1 | 4/2008 | Novick et al. |
| 2008/0291171 A1 | 11/2008 | Shin et al. |
| 2008/0316183 A1 | 12/2008 | Westerman et al. |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0195506 A1 | 8/2009 | Geidl et al. |
| 2009/0267906 A1 | 10/2009 | Schroderus |
| 2009/0288044 A1 | 11/2009 | Matthews et al. |
| 2009/0292989 A1 | 11/2009 | Matthews et al. |
| 2010/0131880 A1 | 5/2010 | Lee et al. |
| 2011/0016390 A1 | 1/2011 | Oh et al. |
| 2011/0035696 A1 | 2/2011 | Elazari et al. |
| 2011/0209088 A1 | 8/2011 | Hinckley et al. |
| 2011/0209099 A1 | 8/2011 | Hinckley et al. |
| 2014/0267123 A1* | 9/2014 | Ludwig .................. G10H 1/00 345/173 |

FOREIGN PATENT DOCUMENTS

| | | |
|---|---|---|
| CN | 101452365 A | 6/2009 |
| DE | 10042300 A1 | 3/2002 |
| DE | 10059906 A1 | 6/2002 |
| DE | 10140874 A1 | 3/2003 |
| DE | 10251296 A1 | 5/2004 |
| EP | 288692 B1 | 7/1993 |
| EP | 664504 | 7/1995 |
| EP | 464908 B1 | 9/1996 |
| EP | 880090 A2 | 11/1998 |
| EP | 1014295 A3 | 1/2002 |
| EP | 1271295 A2 | 1/2003 |
| EP | 1505484 A1 | 2/2005 |
| EP | 1569079 A1 | 8/2005 |
| EP | 1674976 A2 | 6/2006 |
| GB | 2332293 A | 6/1999 |
| GB | 2337349 A | 11/1999 |
| GB | 2344894 A | 6/2000 |
| GB | 2351639 A | 1/2001 |
| GB | 2380583 A | 4/2003 |
| GB | 2402105 A | 12/2004 |
| JP | 9033278 A | 2/1997 |
| JP | 10039748 A | 2/1998 |
| JP | 10171600 A | 6/1998 |
| JP | 10269021 A | 10/1998 |
| JP | 11053093 A | 2/1999 |
| JP | 11085380 A | 3/1999 |
| JP | 11119911 A | 4/1999 |
| JP | 11126132 A | 5/1999 |
| JP | 2000163193 A | 6/2000 |
| JP | 2000231670 A | 8/2000 |
| JP | 2002108543 A | 4/2002 |
| JP | 2004038894 A | 2/2004 |
| JP | 2004110388 A | 4/2004 |
| JP | 2006146579 A | 6/2006 |
| KR | 10-2008-0010266 A | 1/2008 |
| WO | 1997/018547 A1 | 5/1997 |
| WO | 1997/023738 A1 | 7/1997 |
| WO | 1998/014863 A2 | 4/1998 |
| WO | 1998/033111 A1 | 7/1998 |
| WO | 1999/028813 A1 | 6/1999 |
| WO | 1999/038149 A1 | 7/1999 |
| WO | 1999/054807 A1 | 10/1999 |
| WO | 2000/038042 A1 | 6/2000 |
| WO | 2001/002949 A1 | 1/2001 |
| WO | 2002/001482 A1 | 1/2002 |
| WO | 2003/088176 A1 | 10/2003 |
| WO | 2003/098417 A2 | 11/2003 |
| WO | 2003/098421 A1 | 11/2003 |
| WO | 2004/051392 A2 | 6/2004 |
| WO | 2005/064442 A1 | 7/2005 |
| WO | 2005/114369 A2 | 12/2005 |
| WO | 2006/003590 A2 | 1/2006 |
| WO | 2006/020305 A2 | 2/2006 |
| WO | 2006/023569 A1 | 3/2006 |
| WO | 2006/026012 A2 | 3/2006 |
| WO | 2009/032483 A1 | 3/2009 |

OTHER PUBLICATIONS

Non-Final Office Action received for U.S. Appl. No. 11/559,763, dated Apr. 21, 2011, 7 pages.
Non-Final Office Action received for U.S. Appl. No. 11/272,868, dated Apr. 4, 2011, 9 pages.
Non-Final Office Action received for U.S. Appl. No. 11/852,690, dated Feb. 17, 2011, 10 pages.
Non-Final Office action received for U.S. Appl. No. 11/830,766 dated Feb. 17, 2011, 20 pages.
Non-Final Office Action received for U.S. Appl. No. 11/830,757, dated Jan. 20, 2011, 21 pages.
Non-Final Office Action received for U.S. Appl. No. 11/830,774, dated Mar. 18, 2011, 18 pages.
Non-Final Office Action received for U.S. Appl. No. 12/479,678, dated Mar. 31, 2011, 18 pages.
Non-Final Office Action received for U.S. Appl. No. 12/479,573, dated Mar. 31, 2011, 17 pages.
Non-Final Office Action received for U.S. Appl. No. 12/479,617, dated Mar. 31, 2011, 20 pages.
Non-Final Office Action received for U.S. Appl. No. 11/830,808, dated Nov. 23, 2010, 11 pages.
Non-Final Office Action received for U.S. Appl. No. 11/240,788, dated Feb. 9, 2011, 9 pages.
European Search Report received for European Patent Application No. 05772892.5, dated Dec. 13, 2007, 3 pages.

(56) References Cited

OTHER PUBLICATIONS

European Search Report received for European Patent Application No. 06016831.7, dated Dec. 23, 2008, 7 pages.
European Search Report received for European Patent Application No. 06016832.5, dated Jan. 9, 2009, 4 pages.
European Search Report received for European Patent Application No. 08016449.4 dated Dec. 15, 2008, 6 pages.
European Search Report received for European Patent Application No. 08016450.2, dated Dec. 15, 2008, 6 pages.
Final Office Action received for U.S. Appl. No. 10/903,964, dated Dec. 23, 2008, 12 pages.
Final Office Action received for U.S. Appl. No. 10/903,964, dated Jun. 4, 2010, 22 pages.
Final Office Action received for U.S. Appl. No. 10/903,964, dated Mar. 22, 2012, 17 pages.
Non-Final Office Action received for U.S. Appl. No. 10/903,964, dated Jun. 10, 2009, 15 pages.
Non-Final Office Action received for U.S. Appl. No. 10/903,964, dated Mar. 17, 2008, 34 pages.
Non-Final Office Action received for U.S. Appl. No. 10/903,964 dated Sep. 29, 2011, 17 pages.
Final Office Action received for U.S. Appl. No. 10/927,925, dated Dec. 20, 2007, 25 pages.
Final Office Action received for U.S. Appl. No. 10/927,925, dated Nov. 10, 2008, 22 pages.
Non-Final Office Action received for U.S. Appl. No. 10/927,925, dated Jul. 24, 2007, 20 pages.
Non-Final Office Action received for U.S. Appl. No. 10/927,925, dated May 5, 2008, 22 pages.
Final Office Action received for U.S. Appl. No. 11/038,590, dated Nov. 28, 2011, 43 pages.
Final Office Action received for U.S. Appl. No. 11/038,590, dated Oct. 16, 2008, 35 pages.
Non-Final Office Action received for U.S. Appl. No. 11/038,590, dated Apr. 2, 2009, 41 pages.
Non-Final Office Action received for U.S. Appl. No. 11/038,590, dated Dec. 31, 2007, 32 pages.
Non-Final Office Action received for U.S. Appl. No. 11/038,590, dated May 4, 2011, 40 pages.
Notice of Allowance received for U.S. Appl. No. 11/038,590 dated Apr. 2, 2012, 11 pages.
Final Office Action received for U.S. Appl. No. 11/038,590, dated Dec. 31, 2009, 36 pages.
Final Office Action received for U.S. Appl. No. 11/048,264, dated Mar. 1, 2012, 13 pages.
Final Office Action received for U.S. Appl. No. 11/048,264, dated Jul. 6, 2010, 12 pages.
Final Office Action received for U.S. Appl. No. 11/048,264, dated Jul. 7, 2009, 14 pages.
Final Office Action received for U.S. Appl. No. 11/048,264, dated May 11, 2011, 12 pages.
Final Office Action received for U.S. Appl. No. 11/048,264, dated May 21, 2008, 11 pages.
Non-Final Office Action received for U.S. Appl. No. 11/048,264, dated Dec. 11, 2008, 11 pages.
Non-Final Office Action received for U.S. Appl. No. 11/048,264, dated Dec. 18, 2009, 11 pages.
Non-Final Office Action received for U.S. Appl. No. 11/048,264, dated Oct. 29, 2010, 12 pages.
Non-Final Office Action received for U.S. Appl. No. 11/048,264, dated Sep. 28, 2007, 11 pages.
Non-Final Office Action received for U.S. Appl. No. 11/048,264, dated Sep. 29, 2011, 11 pages.
Non-Final Office Action received for U.S. Appl. No. 11/214,839, dated Sep. 17, 2008, 18 pages.
Final Office Action received for U.S. Appl. No. 11/228,758, dated Jun. 7, 2012, 16 pages.
Final Office Action received for U.S. Appl. No. 11/228,758, dated Mar. 5, 2009, 15 pages.
Final Office Action received for U.S. Appl. No. 11/228,758, dated Jul. 20, 2010, 19 pages.
Non-Final Office Action received for U.S. Appl. No. 11/228,758 dated Jul. 31, 2012, 14 pages.
Non-Final Office Action received for U.S. Appl. No. 11/228,758, dated Aug. 18, 2009, 15 pages.
Non-Final Office Action received for U.S Appl. No. 11/228,758 dated Dec. 8, 2011, 16 pages.
Non-Final Office Action received for U.S. Appl. No. 11/228,758, dated Feb. 3, 2010, 20 pages.
Non-Final Office Action received for U.S. Appl. No. 11/228,758, dated Oct. 3, 2008, 16 pages.
Final Office Action received for U.S. Appl. No. 11/240,788, dated Aug. 10, 2011, 7 pages.
Final Office Action received for U.S. Appl. No. 11/240,788, dated Aug. 17, 2010, 9 pages.
Final Office Action received for U.S. Appl. No. 11/240,788, dated Dec. 24, 2008, 12 pages.
Non-Final Office Action received for U.S. Appl. No. 11/240,788, dated Apr. 30, 2008, 12 pages.
Non-Final Office Action received for U.S. Appl. No. 11/240,788, dated Jun. 10, 2009, 13 pages.
Non-Final Office Action received for U.S. Appl. No. 11/240,788, dated Mar. 2, 2010, 13 pages.
Non-Final Office Action received for U.S. Appl. No. 11/240,788, dated Nov. 1, 2007, 20 pages.
Notice of Allowance received for U.S Appl. No. 11/240,788, dated Mar. 9, 2012, 5 pages.
Final Office Action received for U.S. Appl. No. 11/241,839, dated Mar. 17, 2009, 16 pages.
Notice of Allowability received for U.S. Appl. No. 11/241,839 dated Sep. 3, 2009, 10 pages.
Final Office Action received for U.S. Appl. No. 11/272,868, dated Nov. 10, 2011, 9 pages.
Final Office Action received for U.S. Appl. No. 11/272,868, dated Sep. 2, 2010, 9 pages.
Non-Final Office Action received for U.S. Appl. No. 11/272,868, dated Dec. 7, 2009, 7 pages.
Non-Final Office Action received for U.S. Appl. No. 11/272,868, dated Mar. 5, 2009, 15 pages.
U.S Appl. No. 11/272,868, filed Nov. 15, 2005, by Pryor.
Non-Final Office Action received for U.S. Appl. No. 11/349,350, dated Jan. 6, 2009, 10 pages.
U.S. Appl. No. 11/349,350, filed Feb. 8, 2006, by Pryor.
Non-Final Office Action received for U.S. Appl. No. 11/428,501, dated Apr. 2, 2009, 11 pages.
Non-Final Office Action received for U.S. Appl. No. 11/428,501, dated Oct. 14, 2009, 6 pages.
Notice of Allowance received for U.S. Appl. No. 11/428,501, dated Mar. 23, 2010, 8 pages.
Final Office Action received for U.S. Appl. No. 11/428,503, dated May 12, 2010, 12 pages.
Non-Final Office Action received for U.S. Appl. No. 11/428,503, dated Apr. 2, 2009, 12 pages.
Non-Final Office Action received for U.S. Appl. No. 11/428,503 dated Jan. 30, 2012, 15 pages.
Non-Final Office Action received for U.S. Appl. No. 11/428,503, dated Oct. 30, 2009, 9 pages.
Notice of Allowance received for U.S. Appl. No. 11/428,503 dated Jul. 26, 2012, 9 pages.
Final Office Action received for U.S. Appl. No. 11/428,506, dated Mar. 19, 2009, 7 pages.
Non-Final Office Action received for U.S. Appl. No. 11/428,506, dated Sep. 15, 2008, 8 pages.
Non-Final Office Action received for U.S. Appl. No. 11/428,506, dated Sep. 24, 2007, 6 pages.
Notice of Allowability received for U.S. Appl. No. 11/428,506, dated Sep. 2, 2009, 5 pages.
Non-Final Office Action received for U.S. Appl. No. 11/428,515 dated May 23, 2012, 15 pages.
Non-Final Office Action received for U.S. Appl. No. 11/428,515 dated Nov. 23, 2011, 8 pages.

(56) References Cited

OTHER PUBLICATIONS

Non-Final Office Action received for U.S. Appl. No. 11/428,515 dated Sep. 25, 2012, 15 pages.
Non-Final Office Action received for U.S. Appl. No. 11/428,515, dated Feb. 4, 2008, 6 pages.
Non-Final Office Action received for U.S. Appl. No. 11/2428,515, dated Mar. 18, 2009, 12 pages.
Non-Final Office Action received for U.S. Appl. No. 11/428,515, dated Oct. 31, 2008, 7 pages.
Non-Final Office Action received for U.S. Appl. No. 11/428,515, dated Sep. 21, 2007, 7 pages.
Non-Final Office Action received for U.S. Appl. No. 11/428,521, dated Jul. 9, 2008, 11 pages.
Non-Final Office Action received for U.S. Appl. No. 11/428,521, dated Sep. 24, 2007, 6 pages.
Notice of Allowability received for U.S. Appl. No. 11/428,521, dated Feb. 11, 2009, 5 pages.
Notice of Allowability received for U.S. Appl. No. 11/428,521, dated Jul. 10, 2009, 5 pages.
Non-Final Office Action received for U.S. Appl. No. 11/428,522, dated Aug. 25, 2009, 6 pages.
Non-Final Office Action received for U.S. Appl. No. 11/428,522, dated Feb. 17, 2009, 6 pages.
Non-Final Office Action received for U.S. Appl. No. 11/428,522, dated Jan. 27, 2010, 5 pages.
Non-Final Office Action received for U.S. Appl. No. 11/428,522, dated Jan. 28, 2008, 7 pages.
Non-Final Office Action received for U.S. Appl. No. 11/2428,522, dated Sep. 2, 2008, 6 pages.
Final Office Action received for U.S. Appl. No. 11/428.515, dated Nov. 19, 2009, 14 pages.
Final Office Action received for U.S. Appl. No. 11/428,522, dated Jul. 19, 2010, 6 pages.
Non-Final Office Action received for U.S. Appl. No. 11/459,615, dated May 22, 2009, 9 pages.
Final Office Action received for U.S. Appl. No. 11/559,736, dated Apr. 14, 2010, 11 pages.
Non-Final Office Action received for U.S. Appl. No. 11/559,736, dated Sep. 2, 2009, 12 pages.
Notice of Allowance received for U.S. Appl. No. 11/559,736 dated Jun. 27, 2012, 11 pages.
Final Office Action received for U.S. Appl. No. 11/559,763, dated Oct. 29, 2010, 15 pages.
Non-Final Office Action received for U.S. Appl. No. 11/559,763, dated Oct. 6, 2009, 24 pages.
Notice of Allowance received for U.S. Appl. No. 11/559,763, dated Aug. 16, 2011, 9 pages.
Notice of Allowance received for U.S. Appl. No. 11/559,763, dated Aug. 22, 2012, 10 pages.
Notice of Allowance received for U.S. Appl. No. 11/559,763, dated Oct. 26, 2011, 9 pages.
Final Office Action received for U.S. Appl. No. 11/559,799, dated Oct. 19, 2010, 8 pages.
Non-Final Office Action received for U.S. Appl. No. 11/559,799, dated Oct. 5, 2009, 14 pages.
Non-Final Office Action received for U.S. Appl. No. 11/559,822, dated Oct. 29, 2009, 11 pages.
Notice of Allowance received for U.S. Appl. No. 11/559,822, dated Apr. 26, 2010, 9 pages.
Notice of Allowability (Supplemental) received for U.S. Appl. No. 11/559,822, dated May 12, 2010, 2 pages.
Final Office Action received for U.S. Appl. No. 11/559,833, dated Jun. 11, 2010, 8 pages.
Non-Final Office Action received for U.S. Appl. No. 11/559,833, dated Dec. 22, 2009, 6 pages.
Non-Final Office Action received for U.S. Appl. No. 11/677,958, dated Dec. 24, 2009, 6 pages.
Notice of Allowance received for U.S. Appl. No. 11/677,958, dated Jun. 21, 2010, 8 pages.
Final Office Action received for U.S. Appl. No. 11/696,693, dated Jul. 6, 2012, 24 pages.
Final Office Action received for U.S. Appl. No. 11/696,693, dated Nov. 23, 2010, 24 pages.
Non-Final Office Action received for U.S. Appl. No. 11/696,693, dated Dec. 22, 2011, 29 pages.
Non-Final Office Action received for U.S. Appl. No. 11/696,693, dated Jun. 8, 2010, 27 pages.
Final Office Action received for U.S. Appl. No. 11/700,636, dated Mar. 9, 2012, 9 pages.
Final Office Action received for U.S. Appl. No. 11/700,636, dated May 27, 2011, 9 pages.
Non-Final Office Action received for U.S. Appl. No. 11/700,636, dated Nov. 18, 2010, 8 pages.
Non-Final Office Action received for U.S. Appl. No. 11/700,636, dated Sep. 27, 2011, 8 pages.
Final Office Action received for U.S. Appl. No. 11/830,808, dated Apr. 21, 2011, 10 pages.
Final Office Action received for U.S. Appl. No. 11/830,757, dated May 24, 2012, 19 pages.
Non-Final Office Action received for U.S. Appl. No. 11/830,757 dated Sep. 16, 2011, 26 pages.
Non-Final Office Action received for U.S. Appl. No. 11/830,766 dated Jun. 7, 2012, 14 pages.
Non-Final Office Action received for U.S. Appl. No. 11/830,766, dated Sep. 1, 2011, 29 pages.
Final Office Action received for U.S. Appl. No. 11/830,774, dated Sep. 27, 2011, 15 pages.
Non-Final Office Action received for U.S. Appl. No. 11/830,774 dated Jun. 22, 2012, 17 pages.
Final Office Action received for U.S. Appl. No. 11/830,781, dated Nov. 17, 2011, 16 pages.
Non-Final Office Action received for U.S. Appl. No. 11/830,781 dated Jun. 25, 2012, 19 pages.
Non-Final Office Action received for U.S. Appl. No. 11/830,781, dated Apr. 28, 2011, 16 pages.
Final Office Action received for U.S. Appl. No. 11/830,788, dated Apr. 27, 2012, 13 pages.
Final Office Action received for U.S. Appl. No. 11/830,788, dated Dec. 3, 2010, 15 pages.
Non-Final Office Action received for U.S. Appl. No. 11/830,788 dated Sep. 4, 2012, 13 pages.
Non-Final Office Action received for U.S. Appl. No. 11/830,788, dated Jul. 20, 2011, 12 pages.
Non-Final Office Action received for U.S. Appl. No. 11/830,788, dated May 11, 2010, 8 pages.
Final Office Action received for U.S. Appl. No. 11/830,793, dated Mar. 1, 2012, 14 pages.
Final Office action received for U.S. Appl. No. 11/830,793, dated Nov. 26, 2010, 9 pages.
Non-Final Office Action received for U.S. Appl. No. 11/830,793 dated Sep. 6, 2012, 14 pages.
Non-Final Office Action received for U.S. Appl. No. 11/830,793, dated Aug. 4, 2011, 13 pages.
Non-Final Office Action received for U.S. Appl. No. 11/830,793, dated Jun. 9, 2010, 8 pages.
Final Office Action received for U.S. Appl. No. 11/830,801, dated Feb. 17, 2012, 14 pages.
Final office Action received for U.S. Appl. No. 11/830,801, dated Nov. 23, 2010, 13 pages.
Final Office action received for U.S. Appl. No. 11/830,801, dated Oct. 14, 2011, 16 pages.
Non-Final Office Action received for U.S. Appl. No. 11/830,801 dated Aug. 30, 2012, 15 pages.
Non-Final Office Action received for U.S. Appl. No. 11/830,801, dated Jun. 10, 2010, 10 pages.
Final Office Action received for U.S. Appl. No. 11/830,808, dated Aug. 3, 2012, 7 pages.
Non-Final Office Action received for U.S. Appl. No. 11/830,808, dated Jan. 19, 2012, 8 pages.
Non-Final Office Action received for U.S. Appl. No. 11/830,808, dated Jun. 8, 2010, 13 pages.

(56) References Cited

OTHER PUBLICATIONS

Final Office Action received for U.S. Appl. No. 11/830,815, dated Dec. 2, 2010, 15 pages.
Final Office Action received for U.S. Appl. No. 11/830,815, dated Jul. 6, 2012, 15 pages.
Non-Final Office Action received for U.S. Appl. No. 11/830,815 dated Nov. 10, 2011, 15 pages.
Non-Final Office Action received for U.S. Appl. No. 11/830,815, dated Jun. 22, 2010, 12 pages.
Final Office Action received for U.S. Appl. No. 11/832,134, dated Mar. 21, 2011, 33 pages.
Non-Final Office Action received for U.S. Appl. No. 11/832,134 dated May 2, 2012, 25 pages.
Non-Final Office Action received for U.S. Appl. No. 11/832,134, dated Sep. 17, 2010, 26 pages.
Final Office Action received for U.S. Appl. No. 11/852,690, dated Sep. 18, 2012, 13 pages.
Non-Final Office Action received for U.S. Appl. No. 11/852,690, dated Mar. 2, 2012, 12 pages.
Final Office Action received for U.S. Appl. No. 11/878,024, dated Nov. 18, 2011, 18 pages.
U.S. Appl. No. 11/878,024, filed Jul. 20, 2007, by Pryor.
Final office Action received for U.S. Appl. No. 11/980,721, dated Jan. 19, 2011, 9 pages.
Non-Final Office Action received for U.S. Appl. No. 11/980,721, dated Apr. 29, 2011, 10 pages.
Non-Final Office Action received for U.S. Appl. No. 11/980,721, dated Jul. 29, 2010, 9 pages.
Final Office Action received for U.S. Appl. No. 11/980,722, dated Mar. 9, 2011, 11 pages.
Final Office Action received for U.S. Appl. No. 11/980,722, dated May 9, 2012, 14 pages.
Non-Final Office Action received for U.S. Appl. No. 11/980,722, dated Aug. 2, 2010, 5 pages.
Non-Final Office Action received for U.S. Appl. No. 11/980,722, dated Jul. 19, 2011, 12 pages.
Final Office Action received for U.S. Appl. No. 12/118,639, dated Mar. 26, 2012, 7 pages.
Non-Final Office Action received for U.S. Appl. No. 12/118,639, dated May 4, 2011, 7 pages.
Non-Final Office Action received for U.S. Appl. No. 12/118,639, dated Nov. 8, 2011, 5 pages.
Non-Final Office Action received for U.S. Appl. No. 12/118,641 dated May 9, 2012, 4 pages.
Non-Final Office Action received for U.S. Appl. No. 12/118,645 dated May 7, 2012 , 5 pages.
Non-Final Office Action received for U.S. Appl. No. 12/118,648, dated May 17, 2012, 4 pages.
Non-Final Office Action received for U.S. Appl. No. 12/118,659 dated Jul. 27, 2012, 5 pages.
Final Office Action received for U.S. Appl. No. 12/139,411, dated May 8, 2012, 7 pages.
Non-Final Office Action received for U.S. Appl. No. 12/139,411 dated Oct. 27, 2011, 6 pages.
Non-Final Office Action received for U.S. Appl. No. 12/342,027 dated Jun. 29, 2011, 32 pages.
Notice of Allowance received for U.S. Appl. No. 12/342,027 dated Apr. 13, 2012, 10 pages.
Final Office Action received for U.S. Appl. No. 12/422,197, dated Apr. 25, 2012, 12 pages.
Non-Final Office Action received for U.S. Appl. No. 12/422,197, dated Jun. 28, 2011, 18 pages.
Final Office Action received for U.S. Appl. No. 12/422,205, dated Feb. 3, 2012, 16 pages.
Non-Final Office Action received for U.S. Appl. No. 12/422,205 dated Sep. 13, 2012, 16 pages.
Non-Final Office Action received for U.S. Appl. No. 12/422,205, dated Jun. 28, 2011, 13 pages.
Final Office Action received for U.S. Appl. No. 12/422,212, dated Dec. 16, 2011, 20 pages.
Non-Final Office Action received for U.S. Appl. No. 12/422,212, dated Jun. 28 2011, 16 pages.
Non-Final Office Action received for U.S. Appl. No. 12/422,212 dated Apr. 16, 2012, 20 pages.
Final Office Action received for U.S. Appl. No. 12/422,222, dated Apr. 16, 2012, 14 pages.
Non-Final Office Action received for U.S. Appl. No. 12/422,222 dated Aug. 5, 2011, 15 pages.
Final Office Action received for U.S. Appl. No. 12/422,225, dated Jun. 8, 2012, 12 pages.
Non-Final Office Action received for U.S. Appl. No. 12/422,225, dated Aug. 5, 2011, 17 pages.
Final Office Action received for U.S. Appl. No. 12/434,439, dated May 1, 2012, 14 pages.
Non-Final Office Action received for U.S. Appl. No. 12/434,439 dated Aug. 21, 2012, 12 pages.
Non-Final Office Action received for U.S. Appl. No. 12/434.439, dated Oct. 14, 2011, 9 pages.
Final Office Action received for U.S. Appl. No. 12/468,401, dated Apr. 13, 2012, 21 pages.
Non-final Office Action received for U.S. Appl. No. 12/468,401 dated Sep. 30, 2011, 19 pages.
Final Office action received for U.S. Appl. No. 12/479,573, dated Oct. 19, 2011, 13 pages.
Non-Final Office Action received for U.S. Appl. No. 12/479,573 dated Jun. 25, 2012, 11 pages.
Final Office Action received for U.S. Appl. No. 12/479,617, dated Nov. 17, 2011, 18 pages.
Final Office Action received for U.S. Appl. No. 12/479,678, dated Sep. 28, 2011, 13 pages.
Non-Final Office Action received for U.S Appl. No. 12/479,678 dated Apr. 5, 2012 , 13 pages.
Non-Final Office Action received for U.S. Appl. No. 12/500,951 dated Dec. 12, 2011, 8 pages.
Non-Final Office Action received for U.S. Appl. No. 12/500,973, dated Sep. 23, 2011, 5 pages.
Notice of Allowance received for U.S. Appl. No. 12/500,973, dated Mar. 26, 2012, 12 pages.
Final Office Action received for U.S. Appl. No. 12/500,978, dated May 29, 2012, 10 pages.
Non-Final Office Action received for U.S. Appl. No. 12/500,978 dated Dec. 16, 2011, 9 pages.
Non-Final Office Action received for U.S. Appl. No. 12/500,984 dated Jun. 13, 2012, 8 pages.
Non-Final Office Action received for U.S. Appl. No. 12/500,984, dated Dec. 9, 2011, 9 pages.
European Search Report received for European Patent Application No. 12166818.0, dated Jun. 8, 2012, 7 pages.
European Search Report received for EP Application) No. 12166820.6, dated Jun. 14, 2012, 6 pages.
Notice of Allowance received for U.S Appl. No. 13/556,019, dated Sep. 6, 2012, 7 pages.
International Search Report received for PCT Application No. PCT/US2004/009701, dated Aug. 28, 2007, 1 page.
International Search Report received for PCT Application No. PCT/US2007/002512, dated Aug. 11, 2008, 3 pages.
International Search Report received for PCT Application No. PCT/US2008/051727, dated Oct. 8, 2008, 6 pages.
Notice of Allowance received for Korean Patent Application No. 10-2010-7022243, dated Sep. 28, 2011, 3 pages.
Final Office Action received for U.S. Appl. No. 11/228,700, dated May 12, 2009, 14 pages.
Non-Final Office Action received for U.S. Appl. No. 11/228,700, dated Sep. 17, 2008, 19 pages.
Notice of Allowance received for the U.S. Appl. No. 11/228,700, dated Jul. 22, 2009.
Final Office Action received for U.S. Appl. No. 11/459,615, dated Dec. 8, 2009, 12 pages.
Non-Final Office Action received for U.S. Appl. No. 11/459,615, dated Apr. 13, 2010, 10 pages.
Non-Final Office Action received for U.S. Appl. No. 11/459,615, dated May 22, 2009, 10 pages.

(56) References Cited

OTHER PUBLICATIONS

Final Office Action Received for U.S. Appl. No. 12/790,479, dated Dec. 4, 2013, 24 pages.
Non-Final Office Action Received for U.S. Appl. No. 12/790,479, dated Jul. 12, 2013 23 pages.
Final Office Action received for U.S. Appl. No. 11/349,350, dated Nov. 12, 2009, 9 pages.
Non-Final Office Action received for U.S. Appl. No. 11/878,024, dated Jun. 7, 2011, 10 pages.
Final Office Action received for U.S. Appl. No. 11/696,701, dated Feb. 27, 2014 12 pages.
Final Office Action received for U.S. Appl. No. 11/696,701, dated Jul. 27, 2012 14 pages.
Final Office Action received for U.S. Appl. No. 11/696,701, dated Nov. 26, 2010, 13 pages.
Non-Final Office Action received for U.S. Appl. No. 11/696,701, dated Dec. 22, 2011, 13 pages.
Non-Final Office Action received for U.S. Appl. No. 11/696,701, dated Jun. 10, 2010, 13 pages.
Notice of Allowance received for U.S. Appl. No. 11/696,701, dated Sep. 11, 2015, 9 pages.
European Search Report received for European Patent EP1621989 (@ Beyer Weaver & Thomas, LLP) dated Mar. 27, 2006.
Office Action received for European Patent Application No. 06801347.3, dated Dec. 15, 2011, 5 pages.
Office Action received for European Patent Application No. 06801347.3, dated May 22, 2012, 5 pages.
Office Action received for European Patent Application No. 06801347.3, dated Oct. 14, 2008.
Office Action received for European Patent Application No. 07 709 955.4, dated Jul. 31, 2009.
Office Action received for Korean Patent Application No. 10-2008-7006262, dated Aug. 25, 2010.
Office Action received for Korean Patent Application No. 10-2008-7006262, dated Jan. 11, 2010, 11 pages.
Office Action received for Korean Patent Application No. 10-2010-7022243, dated Dec. 11, 2010, 3 pages.
Notice of Acceptance received for Australian Patent Application No. 2006295354, dated Oct. 8, 2010, 2 pages.
Office Action received for Australian Patent Application No. 2006295354, dated Jul. 24, 2009, 2 pages.
Office Action received for Chinese Patent Application No. 200680033890.X, dated Jan. 29, 2010, 3 pages.
Office Action received for Chinese Patent Application No. 200780006621.9, dated Aug. 16, 2010, 4 pages (English Translation only).
International Preliminary Report on Patentability received for PCT Patent Application No. PCT/US2005/025657, dated Mar. 13, 2007, 22 pages.
International Search Report received for PCT Application No. PCT/US2006/008349, dated Oct. 6, 2006, 3 pages.
International Preliminary Report on Patentability received for PCT Patent Application No. PCT/US2006/031523, dated Mar. 18, 2008, 9 pages.
International Preliminary Report on Patentability received for PCT Patent Application No. PCT/US2006/031526, dated Nov. 27, 2008, 8 pages.
International Search Report and Written Opinion received for PCT Patent Application No. PCT/US2006/031527, dated Feb. 27, 2007, 14 pages.
International Search Report and Written Opinion received for PCT Patent Application No. PCT/US2007/060119, dated Apr. 11, 2008, 18 pages.
Invitation to Pay Additional Fees received for PCT Patent Application No. PCT/US2007/060119, dated Jan. 2, 2008, 9 pages.
International Search Report and Written Opinion received for PCT Patent Application No. PCT/US2007/088904, dated Sep. 15, 2008, 16 pages.
Invitation to Pay Additional Fees received for PCT Patent Application No. PCT/US2007/088904, dated Jun. 23, 2008, 8 pages.

Extended European Search Report received for European Patent Application No. 06016830.9, dated Dec. 3, 2007, 9 pages.
Extended European Search Report received for European Patent Application No. 06016856.4, dated Mar. 14, 2008 7 pages.
Annex to Form PCT/ISA/206 Communication Relating to the Results of the Partial International Search received for PCT Application No. PCT/US2005/025641 dated Feb. 19, 2007.
International Search Report received for the PCA Application No. PCT/US2005/03325, dated Mar. 3, 2006.
Office Action received for U.S. Appl. No. 11/696,701, dated Jun. 20, 2013, 35 pages.
Office Action received for Japanese Patent Application No. 2005 531107, dated Nov. 4, 2011, 4 pages.
Office Action received for Japanese Patent Application No. 2012 106292, dated Aug. 9, 2013, 4 pages.
Office Action received for European Patent Application No. 06016830.9, dated Aug. 6, 2008.
European search report for European Patent Application No. 06016830.9 dated Dec. 3, 2007.
European Search Report for European Patent Application No. 06016855.6, dated Jan. 25, 1999, 6 pages.
European examination report for European Patent Application No. 060168564 dated Sep. 16, 2008.
Extended European search report for European Patent Application No. 06016858 0, dated Dec. 21, 2007.
Korean Office Action (with English translation) received for Korean Patent Application No. 10-2007-7005010, dated May 17, 2008, 15 pages.
Japanese Office Action received for Japanese Patent Application No. 2007- 523644, dated Oct. 27, 2008, 1 page.
Office Action received for European Patent Application No. 99904228.6, dated Apr. 20, 2006.
Office Action received for European Patent Application No. 99904228.6, dated Mar. 23, 2007.
European supplementary search report for European Patent Application No. 99904228.6. dated Feb. 16, 2005.
International Search Report and Written Opening received for PCT Application No. PCT/US2005/025641, dated Apr. 24, 2007, 5 pages.
International Search Report received for PCT Application No. PCT/US99/01454, dated May 14, 1999.
"Centroid", http://www.pballew.net/centroid.html, Apr. 28, 2006, 3 pages.
"Centroid", available at <http://faculty.evansville.edu/ck6/tcenters/class/centroid.html>, Apr. 28, 2006, 1 page.
"Compare Keyboards with the Keyboard Compatibility Chart, Learn more about Alternative Keyboards", Solutions for Humans, available at <http://www.keyalt.com/kkeybrdp.htm>, Dec. 8, 2005, 5 pages.
"Devices", Technology Loan Catalog, available at <http://www.tsbvi.edu/outreach/techioan/catalog.html>, retrieved on Dec. 8, 2005, 10 pages.
"Fastap", DigitWireless, available at <http://www.digitwireless.com/about/faq.html>, Dec. 6, 2005, 5 pages.
"Fastap Keypads Redefine Mobile Phones", DigitWireless, available at <http://www.digitwireless.com>, retrieved on Nov. 18, 2005, 10 pages.
"Four-Button Keyboard", WikiPodlinux, available at <http://ipodlinux.org/Four_Button_Keyboard>, retrieved on Dec. 5, 2005>, 2 pages.
"Gesture Recognition", available online at <http://www.fingerworks.com/gesture_recognition.html>, retrieved on Jul. 25, 2006, 2 pages.
"Introducing the Ultimate Smartphone Keypad", Delta II™ Keypads, available at <http://www.chicagologic.com>, retrieved on Nov. 18, 2005, 2 pages.
"LG Develops New Touch Pad Cell Phones", Textually, available at <http://textually.ora/textually/archives/2005/06/009903.html>, retrieved on Nov. 18, 2005, 1 page.
"Microsoft New-Smart Phone Interface: Your Thumb", Textually, available at <htto://www.textuallv.org>, retrieved on Nov. 18, 2005, 2 pages.
"P900 User Guide", Sony Ericsson Mobile Communications AB, XP002479719, available at <http://www.sonyericcson.com/downloads/P900_UG_R1b_EN.pdf>, Sep. 2003, 98 pages.

(56) References Cited

OTHER PUBLICATIONS

"Samsung Releases Keyboard Phone in US", Textually, available at <http://www.textually.ora/textually/archives/2005/11 /01 0482. html>, retrieved on Nov. 18, 2005, 1 page.
"T9® Text Input for Keypad Devices", Available at <http://tegic.com>, 1 page.
"Text Input (legacy)", WikiPodlinux, available at <http://ipodlinux.org/TextInput_%28legacy%29>, retrieved on Dec. 5, 2005, 8 pages.
"Text Input Concepts", WikiPodlinux, available at <http://web.archive.ora/web/20051211165254/http://ipodlinux.ora/Text_Input_Concepts>, Dec. 2005, 3 pages.
"Text Input Methods", WikiPodlinux, available at <http://ipodlinux.org/Text_Input_Methods>, retrieved on Dec. 5, 2005, 5 pages.
"You Heard of Touch Screens Now Check Out Touch Keys", Phoneyworld, available at <http://www.phonevworld.com>, retrieved on Nov. 18, 2005, 2 pages.
"4-Wire Resistive Touchscreens", available online at <http://www.touchscreens.com/intro-touchtypes-4resistive.html>, retrieved on Aug. 5, 2005.
"5-Wire Resistive Touchscreens", available online at <http://www.touchscreens.com/intro-touchtypes-resistive.html>, retrieved on Aug. 5, 2005.
"A Brief Overview of Gesture Recognition", available online at <http://www.Dai. Ed. Ac.uk/Cvonline/LOCA_COPIES/COHEN/gesture_ overview.html>, retrieved on Apr. 20, 2004.
"Capacitive Position Sensing", available online at <http://www.synaptics.com/technology/cps.cfin>, retrieved on Aug. 5, 2005.
"Capacitive Touchscreens", available online at <http://www.touchscreens.com/intro- touchtypes-capacitive.html>, retrieved on Aug. 5, 2005.
"Comparing Touch Technologies", available online at <http://www.touchscreens.com/intro-touchtypes.html>, retrieved on Oct. 10, 2004.
"FingerWorks—Gesture Guide—Application Switching", available online at <http://www.fingerworks.com/gesture_guide_apps.html>, retrieved on Aug. 27, 2014, 1 page.
"FingerWorks—Gesture Guide—Editing", available online at <http://www.fingerworks.com/gesure_guide_editing.html>, retrieved on Aug. 27, 2004, 1 page.
"FingerWorks—Gesture Guide—File Operations", available online at <http://www.fingerworks.com/gesture_guide_files.html>, retrieved on Aug. 27, 2004, 1 page.
"FingerWorks—Gesture Guide—Text Manipulation", available online at <http://www.fingerworks.com/gesture_guide_text_manip.html>, retrieved on Aug. 27, 2004, 2 pages.
"FingerWorks—Gesture Guide—Tips and Tricks", available online at <http://www.fingerworks.com/gesture_guide_tips.html>, retrieved on Aug. 27, 2004, 2 pages.
"FingerWorks—Gesture Guide—Web", available online at <http://www.fingerworks.com/gesture_guide_web.html>, retrieved on Aug. 27, 2004, 1 page.
"FingerWorks—Guide to Hand Gestures for USB Touchpads", available online at <http://www.fingerworks.com/igesture_userguide.html>, retrieved on Aug. 27, 2004, 1 page.
"FingerWorks—iGesture—Technical Details", available online at <http://www.fingerworks.com/igesture_tech.html>, retrieved on Aug. 27, 2004, 1 page.
"FingerWorks—The Only Touchpads with Ergonomic Full-Hand Resting and Relaxation!", available online at <http://www.fingerworks.com/resting.html>, Copyright 2001, 1 page.
"FingerWorks—Tips for Typing on the Mini", available online at <http://www.fingerworks.com/mini_typing.html>, retrieved on Aug. 27, 2004, 2 pages.
"GlidePoint®", available online at <http://www.cirque.com/technology/technology_gp.html>, retrieved on Aug. 5, 2005.
"How do touchscreen monitors know where you're touching?", available online at <http://www.electronics.howstuffworks.com/question716.html>, retrieved on Aug. 5, 2005.
"How Does a Touchscreen Work?", available online at <http://www.touchscreens.com/intro-anatomy.html>, retrieved on Aug. 5, 2005.

"Igesture Pad—the MultiFinger USB TouchPad with Whole-Hand Gestures", available online at <http://www.fingerworks.com/igesture.html>, retrieved on Aug. 27, 2004, 2 pages.
"Igesture Products for Everyone (learn in minutes) Product Overview", available online at <http://www.fingerworks.com>, retrieved on Aug. 30, 2005, 6 pages.
"Infrared Touchscreens", available online at <http://www.touchscreens.com/intro-touchtypes-infrared.html>, retrieved on Aug. 5, 2005.
"Mouse Emulation", FingerWorks available online at <http://www.fingerworks.com/gesture_guide_mouse.html>, retrieved on Aug. 30, 2005.
"Mouse Gestures", Optim oz, May 21, 2004.
"Mouse Gestures in Opera", available online at <http://www.opera.com/products/desktop/mouse/index.dml>, retrieved on Aug. 30, 2005.
"Mouse Gestures in Opera", Available online at <http://www.opera.com.features/mouse/>, retrieved on Apr. 20, 2004.
"MultiTouch Overview", FingerWorks available online at <http://www.fingerworks.com/multoverview.html>, retrieved on Aug. 30, 2005.
"Near Field Imaging Touchscreens", available online at <http://www.touchscreens.com/intro-touchtypes-nfi.html>, retrieved on Aug. 5, 2005.
"PenTouch Capacitive Touchscreens", available online at <http://www.touchscreens.com/intro-touchtypes-pentouch.html>, retrieved on Aug. 5, 2005.
"Surface Acoustic Wave Touchscreens", available online at <http://www.touchscreens.com/intro-touchtypes-saw.html>, retrieved on Aug. 5, 2005.
"Symbol Commander", available online at <http://www.sensiva.com/symbolcommander/,>, retrieved on Aug. 30, 2005.
"Tips for Typing", FingerWorks available online at <http://www.fingerworks.com/mini_typing.html>, retrieved on Aug. 30, 2005.
"Touch Technologies Overview", 3M Touch Systems, Massachusetts, 2001.
"Touch Technologies: Touch is Everywhere", available online at <http://www.3m.com/3MTouchSystems/downloads/PDFs/TouchTechOV.pdf>, retrieved on Aug. 30, 2005.
"Wacom Components—Technology", available online at <http://www.wacom-components.com/english/tech.asp>, retrieved on Oct. 10, 2004.
"Watershed Algorithm", available online at <http://rsb.info.nih.gov/ij/plugins/watershed.html>, retrieved on Aug. 5, 2005.
"(graphical or virtual) (jog dial) or (jog wheel) or (scroll wheel}", Ask Search located at <http://www.ask.corn/web?q=%2Bgraphical+or+virtual%29++%28jog+job+dia!%29+or+%28Jo>last visited Feb. 27, 2011, 2 Pages.
"Ai Squared Products", Available online at <http://www.aisquared.com/Products/index.cfm>, Oct. 25, 2005, 2 pages.
"Ai Squared Products—ZoomText Magnifier", Available online at <http://www.aisquared.com/Products/zoomtextmag/index.cfm>, Oct. 26, 2005, 4 pages.
"Emulating Mouse Scroll Wheel?", Ask Search located at <http://www.askcom/web"?q=emula!e+scroH+wheel&qsrc"'1 &o=O& 1'"dir &q!c:I,A23E49EA.> last visited Mar. 23, 2012, 1.
"Jog Dial", Available online at, <http://www.ask.com/wiki/Jog . . . dial>, last visited Feb. 27, 2011, 2 pages.
"Jog Shut!!e Graphical", (Apr. 1, 1994), IBM Technical Disclosure Bulletin, vol. 37, No. 4A, 47-48.
"Lunar Screen Magnifier and Lunar Plus Enhanced Screen Magnifier", Available online at <http://www.dolphincomputeraccess.com/products/lunar.htm>, Oct. 25, 2005, 6 pages.
"Touchscreen Technology Choices", http://www.elotouch.com/Products/detech2.asp, retrieved on Aug. 5, 2005.
"Virtual Scroll Wheel", (2012), Ask search located at <http://www.ask.com/web?q=vir!ual+s-croil+wheel&qsrc=O&o=Q&1=dir&oo=O>, last visited March 23, 2012, 2 Pages.
"Visual Disabilities", available online at <http://depts.stcc.edu/ods/ACCESS/bpvisual.htm>, Oct. 25, 2005, 3 pages.
"What Is a Jog Wheel?", Ask Saarch located at <http://www.ask.com/web?q•:what+is+a+j og+wheel&search=&qsrc=O&o=O&1=dirlast> visited on Feb. 27, 2011, 2 pages.

(56) References Cited

OTHER PUBLICATIONS

Notification of Reason(s) for Refusal dated Apr. 25, 2011, for JP Patent Application No. 2008-531106, with English Translation, 5 pages.
Bales et al., "Marking Parts to Aid Robot Vision", (Apr. 1981) NASA Technical Paper 1819, 37 Pages.
Bier et al., "Toolglass and Magic Lenses: The See-Through Interface", Computer Graphics (SIGGRAPH '93 Proceedings), vol. 27, 1993, pp. 73-80.
Buxton et al., "Issues and Techniques in Touch-Sensitive Tablet Input", (Jul. 22, 1985), Proceedings ACM Siggraph, pp. 215-224.
Casario, M., "Hands on Macromedia World: Touch Screen Keypad for Mobile Phone by DoCoMo", available at <http://casario.bloqs.com/mmworld/2005/10/touch_screen_ke. html>, retrieved on Nov. 18, 2005, 1 page.
Chang et al., "A Hashing-Oriented Nearest Neighbor Searching Scheme", (Aug. 1, 1993) Pattern Recognition Lellers, vol. 14, No. 8, 625-630.
Chen et al., "Flowfield and Beyond: Applying Pressure-Sensitive Multi-Point Touchpad Interaction", Multimedia and Expo, 2003, ICME '03, Proceedings, Jul. 9, 2003, pp. 49-52.
Crowley, J. L.., "Vision for Man-Machine Interaction", Robotics and Autonomous Systems. Elsevier Science Publishers. Amsterdam. NL., vol. 19. No. 3-4, Mar. 1, 1997, pp. 347-358.
Davis et al., "Determining 3-D Hand Motion", Signals, Systems and Computers, 1994. 1994 Conference Record of the Twenty-Eighth Asilomar Conference on, Oct. 31, vol. 2, 1994, pp. 1262-1266.
Day, B., "Will Cell Phones Render iPods Obsolete?", available at <http://weblogs.iavanet/pub/wig/883>, Dec. 12, 2005, 3 pages.
Douglas et al., "The Ergonomics of Computer Pointing Devices", Springer-Verlag, London, 1997.
EVB Elektronik, "TSOP6238 IR Receiver Modules for Infrared Remote Control Systems", Jan. 2004, 1 page.
Fisher et al., "Repetitive Motion Disorders: The Design of Optimal Rate-Rest Profiles", Human Factors, vol. 35, No. 2, Jun. 1993, pp. 283-304.
Fukumoto et al., "Body Coupled FingeRing": Wireless Wearable Keyboard, CHI97, Mar. 1997, pp. 147-154.
Fukumoto et al., "ActiveClick: Tactile Feedback for Touch Panels", CHI 2001, 2001, pp. 121-122.
Gorman, M., "Hands-on with Immersion HD Integrator hi-fi-haptics", Engadget.com, http://www.engadget.com/2012/02/23/hands-on-with-immersion-hd-integrator-hi-fi-haptics/?utm_medium=referral &utm_source=pulsenews, Feb. 23, 2012, 4 pages.
Hardy, "Fingerworks", available online at <www.BBC World on Line.>, retrieved on Mar. 7, 2002.
Heap et al., "Towards 3D Hand Tracking using a Deformable Model", Proceedings of the Second International Conference on Killington, Oct. 14, 1996, pp. 140-145.
Hillier et al., "Introduction to Operations Research", Holden-Day, Incorporated, 1986.
Hinckley et al., "Touch-Sensing Input Devices", CHI '99, Proceedings of the SIGCHI conference on Human Factors in Computing Systems, May 15-20, 1999, pp. 223-230.
Jacob et al., "Integrality and Separability of Input Devices", ACM Transactions on Computer-Human Interaction, vol. 1, No. 1, Mar. 1994, pp. 3-26.
Jones, Randall, "MTC Express Multi-touch Controller", Computer Music Journal, vol. 25, No. 1, 2001, pp. 97-99.
Kahney, L, "Pocket PCs Masquerade as I Pods", http://archive.wired.com/gadgets/mac/news/2004/03/62542?currentPage=all, last visited on Apr. 28, 2008, 2 pages.
Kionx, "KXP84 Series Summary Data Sheet", Kionix 2005, Rev 0.4, Oct. 21, 2005, pp. 1-4.
Lecuyer et al., "Feeling Bumps and Holes without a Haptic Interface: the Perception of Pseudo-Haptic Textures", CHI 2004, Vienna Austria, Apr. 2004, 6 pages.
Lee, "A Fast Multiple-Touch-Sensitive Input Device", Master's Thesis, University of Toronto, 1984.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Malik et al., "Visual Touchpad: A Two-Handed Gestural Input Device", Proceedings of the 6th International conference on Multimodal Interfaces, State College, PA, Oct. 13-15, 2004, ICMI 04, ACM, pp. 289-296.
Matsushita et al., "HoloWall: Designing a Finger, Hand, Body and Object Sensitive Wall", UIST '97 Proceedings of the 10th annual ACM symposium on User interface software and technology, Oct. 1997, 2 pages.
Mohri, K. "Wearable Human Interface Based on Hand/finger Gesture Recognition", Human Interface Association Magazine vol. 2, No. 4, pp. 9-18 (Only Abstract in English).
Nirei et al., "Human Hand Tracking from Binocular Image Sequences", Proceedings of the 1996 IEEE IECON 22 international Conference, Taipei, Taiwan. Aug. 5-10, 1996 Industrial Electronics, Control and Instrumentation, vol. 1, No. 5, pp. 297-302.
O'Neal, "Smart Phones with Hidden Keyboards", available at <http://msc.com/4250-6452_16-6229969-1.html>, Nov. 18, 2005, 3 pages.
Pavlovic et al., "Visual Interpretation of Hand Gestures for Human-Computer Interaction: A Review", IEEE Transactions on Pattern Analysis and Machine Intelligence, vol. 19, No. 7, Jul. 1, 1997, pp. 677-695.
Poupyrev et al., "Tactile Interfaces for Small Touch Screens", 2003, 4 pages.
Quantum Research Group, "QT510 / Qwheel™ Touch Slider IC" copyright 2004-2005, 14 pages.
Quek, "Unencumbered Gestural Interaction", IEEE vol. 3 , No. 4, Dec. 1, 1996, pp. 36-47.
Radwin, "Activation Force and Travel Effects on Overexertion in Repetitive Key Tapping", Human Factors, vol. 39, No. 1, Mar. 1997, pp. 130-140.
Rekimoto et al., "SmartSkin: An Infrastructure for Freehand Manipulation on Interactive Surfaces", Proceedings of the SIGCHI conference on Human factors in computing systems, vol. 4, Issue 1, Apr. 25, 2002, pp. 113-120.
Rekimoto et al., "ToolStone: Effective Use of the Physical Manipulation Vocabularies of Input Devices", In Proc. of UIST 2000, 2000, pp. 109-117.
Rubine, Dean, "Combining Gestures and Direct Manipulation", CHI '92, May 3-7, 1992, pp. 659-660.
Rubine, Dean Harris., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Rubine et al., "Programmable Finger-Tracking Instrument Controllers", Computer Music Journal, vol. 14, No. 1, 1990.
Rutledge et al., "Force-To-Motion Functions for Pointing", Human-Computer Interaction—INTERACT, 1990, pp. 701-706.
Schiphorst et al., "Using a Gestural Interface Toolkit for Tactile Input to a Dynamic Virtual Space", Conference on Human Factors in Computing Systems, Proceedings, Apr. 25, 2002, pp. 754-755.
Sears et al., "Data Entry for Mobile Devices Using Soft Keyboards: Understanding the Effects of Keyboard Size and User Tasks", Abstract, Int'l Journal of Human-Computer Interaction, vol. 16, No. 2, 2003, 1 page.
Smith et al., "Relating Distortion to Performance in Distortion Oriented Displays", Proceedings of Sixth Australian Conference on Computer-Human Interaction, Nov. 1996, pp. 6-11.
Subatai, Ahmad, "A Usable Real-Time 3D Hand Tracker", Proceedings of the 28th Asilomar Conference on Signals, Systems and Computers—Part 2 (of2), vol. 2, Oct. 1994, pp. 1257-1261.
Sun Microsystems, "The Star7 PDA Prototype", Available at <https://www.youtube.com/watch?v=Ahg8OBYixL0> last visited Jan. 15, 2010, 7 pages.
Tactilicio.us, "Mobile Haptics", downloaded tactilicio.us/category/mobile-haptics/, Mar. 28, 2009, 5 pages.
Texas Instruments, "TSC2003 / I2C Touch Screen Controller", Data Sheet SBAS 162, Oct. 2001, 20 pages.

(56) References Cited

OTHER PUBLICATIONS

The Gadgeteer, "Apple IPod (30GB)", Available at <http://thegadgeteer.com/review/apple_ipod_30gb_review> last visited Apr. 28, 2008, 19 pages.
Tidwell, J, "Builders and Editors", from Designing Interfaces Copyright 2006, O'Reilly Media, Inc., 2006, 18 pages.
Tidwell, Jenifer, "Magnetism", Designing Interfaces, 2006, pp. 261-262.
Wellner, Pierre, "The DigitalDesk Calculators: Tangible Manipulation on a Desk Top Display", In ACM UIST '91 Proceedings, Nov. 11-13, 1991, pp. 27-33.
Westerman et al., "Multi-Touch: A New Tactile 2-D Gesture Interface for Human-Computer Interaction", Proceedings of the Human Factors and Ergonomics Society 45th Annual Meeting, 2001, pp. 632-636.
Westerman, Wayne, "Hand Tracking, Finger Identification, and Chordic Manipulation on a Multi-Touch Surface", Dissertation University of Delaware, Jan. 1, 1999, pp. 1-333.
Williams, "Applications for a Switched-Capacitor Instrumentation Building Block", Linear Technology Application Note 3, Jul. 1985, pp. 1-16.
Yamada et al., "A Switched-Capacitor Interface for Capacitive Pressure Sensors", IEEE Transactions on Instrumentation and Measurement, vol. 41, No. 1, Feb. 1992, pp. 81-86.
Yeh et al., "Switched Capacitor Interface Circuit for Capacitive Transducers", IEEE, 1985, pp. 472-476.
Zhai et al., "Dual Stream Input for Pointing and Scrolling", Proceeding CHI EA '97 CHI '97 Extended Abstracts on Human Factors in Proceeding CHI EA '97 CHI '97 Extended Abstracts on Human Factors in Computing Systems, 1997, pp. 305-306.
Zimmerman et al., "Applying Electric Field Sensing to Human-Computer Interfaces", Proceeding CHI '95 Proceedings of the SIGCHI Conference on Human Factors in Computing Systems, 1995, pp. 280-287.
Decision to Grant received for European Patent Application No. 06801347.3, dated Aug. 25, 2016, 2 page.
Notice of Allowance Received for Chinese Patent Application No. 201080063760.7, dated Jul. 6, 2016, 4 pages (2 pages of English Translation and 2 pages of Official copy).
Summons to Attend Oral Proceedings received for European Patent Application No. 06801347.3, dated Jul. 14, 2015, 6 pages.
Non-Final Office Action received for U.S. Appl. No. 11/459,606, dated May 28, 2009, 19 pages.
Non-Final Office Action received for U.S. Appl. No. 11/961,663, dated Nov. 18, 2010, 22 pages.
Final Office Action Received for U.S. Appl. No. 12/790,479, dated Mar. 4, 2013, 26 pages.
Non-Final Office Action Received for U.S. Appl. No. 12/790,479, dated Sep. 4, 2012, 30 pages.
Notice of Allowance received for U.S. Appl. No. 12/790,479, dated Mar. 28, 2014, 9 pages.
Office Action received for Chinese Patent Application No. 201080063760.7, dated Jun. 10, 2015, 8 pages (Official Copy only) (See Communication under 37 CFR § 1.98(a) (3)).
Office Action received for Chinese Patent Application No. 201080063760.7, dated Sep. 3, 2014, 7 pages (Official Copy only) (See Communication under 37 CFR § 1.98(a) (3)).
Office Action received for European Patent Application No. 07709955.4, dated Oct. 10, 2008, 5 pages.
Office Action received for Korean Patent Application No. 10-2008-7019114, dated Aug. 31, 2010, 4 pages (1 page of English Translation and 3 pages of Official copy).
International Preliminary Report on Patentability received for PCT Patent Application No. PCT/US2006/031527, dated Mar. 18, 2008, 11 pages.
International Preliminary Report on Patentability received for PCT Patent Application No. PCT/US2010/062318, dated Jul. 19, 2012, 12 pages.
International Search Report and Written Opinion received for PCT Patent Application No. PCT/US2010/062318, dated Mar. 23, 2011, 14 pages.
Intention to Grant received for European Patent Application No. 06801347.3, dated Mar. 15, 2016, 6 pages.
Office Action received for Japanese Patent Application No. 2008-531107, dated Feb. 28, 2011, 5 pages of English Translation Only.
Office Action Received for Chinese Patent Application No. 2010800637607, dated Oct. 30, 2015, 16 pages (10 pages of English Translation and 6 pages of Official Copy).
Office Action received for European Patent Application No. 10799260.4, dated Aug. 10, 2017, 13 pages.

\* cited by examiner

| | | |
|---|---|---|
| | 651 Duration < Z | 681 No Activation |
| | 652 Duration < X and > Z | 682 Single Activation |
| | 654 Duration ≥ X and Duration < Y | 684 Repeated Activation as Function of Duration |
| | 656 Duration ≥ Y | 686 No Activation |

| Combination of Virtual Keys | Combination of Predetermined Behavioral Characteristics | Reaction |
|---|---|---|
| ⋮ | ⋮ | ⋮ |

OPERATION OF A COMPUTER WITH TOUCH SCREEN INTERFACE

CROSS-REFERENCE TO RELATED APPLICATIONS

This application is a continuation of application Ser. No. 11/696,701 filed Apr. 4, 2007, issued as U.S. Pat. No. 9,239,677, from which priority under 35 U.S.C. § 120 is claimed, which is hereby incorporated by reference in its entirety, which application is a continuation of application Ser. No. 11/228,700 filed Sep. 16, 2005, issued as U.S. Pat. No. 7,614,008, from which priority under 35 U.S.C. § 120 is claimed, which is hereby incorporated by reference in its entirety, which application is a continuation-in-part of prior application Ser. No. 10/903,964, issued as U.S. Pat. No. 8,479,122, from which priority under 35 U.S.C. § 120 is claimed, which is hereby incorporated by reference in its entirety. This application is also related to the following applications: U.S. Ser. No. 10/840,862, filed May 6, 2004, issued as U.S. Pat. No. 7,663,607; U.S. Ser. No. 11/048,264, filed Jul. 30, 2004; U.S. Ser. No. 11/038,590, filed Jul. 30, 2004, issued as U.S. Pat. No. 8,239,784; U.S. Ser. No. 11/228,737, entitled "ACTIVATING VIRTUAL KEYS OF A TOUCH-SCREEN VIRTUAL KEYBOARD", filed Sep. 16, 2005, issued as U.S. Pat. No. 7,844,914; and U.S. Ser. No. 11/228,758, entitled "VIRTUAL INPUT DEVICE PLACEMENT ON A TOUCH SCREEN USER INTERFACE", filed Sep. 16, 2005; all of which are hereby incorporated herein by reference in their entirety for all purposes.

BACKGROUND

Technical Field

The present patent application relates to touch screen user interfaces and, in particular, relates to operation of a computer based on interaction by a user with a virtual GUI item, such as a virtual keyboard on a touch screen user interface.

Description of the Related Art

A touch screen is a type of display screen that has a touch-sensitive transparent panel covering the screen, or can otherwise recognize touch input on the screen. Typically, the touch screen display is housed within the same housing as computer circuitry including processing circuitry operating under program control. When using a touch screen to provide input to an application executing on a computer, a user makes a selection on the display screen by pointing directly to graphical user interface (GUI) objects displayed on the screen (usually with a stylus or a finger).

A collection of GUI objects displayed on a touch screen may be considered a virtual keyboard. Similar to a conventional external keyboard that is not so closely associated with a display screen, the virtual keyboard includes a plurality of keys ("virtual keys"). Activation of a particular virtual key (or combination of virtual keys) generates a signal (or signals) that is provided as input to an application executing on the computer.

Touch screen keyboards, by nature of the hardware on which they operate, typically glean much more information about a user's actions than can be gleaned with a typical external keyboards. For example, whereas a typical external keyboard includes a single "sensor" (such as a mechanical switch or electrical connection) or a small number of sensors per key, touch screen keyboards typically have many more sensors per virtual key.

It is desirable to use the information about a user's actions to make the user experience with the computer, via the touch screen virtual keyboard, more powerful than is usual (or, perhaps, even possible) with computers using external keyboards.

On the other hand, even touch screens, with their numerous sensors, typically lack the ability to directly glean some types of information about a user's actions. It is desirable to use the information available to infer other types of information, for example, information which cannot be directly gleaned about the user's actions.

SUMMARY

A touch screen computer executes an application. A method of operating the touch screen computer in response to a user is provided. A virtual input device is provided on the touch screen. The virtual input device comprises a plurality of virtual GUI items (which may be, in some specific examples, virtual keys of a virtual keyboard). It is detected that a user has touched the touch screen to nominally activate at least one virtual GUI item (e.g., virtual key), and a behavior of the user with respect to touch is determined. The determined behavior is processed and a predetermined characteristic is associated with the nominally-activated at least one virtual GUI item. A reaction to the nominal activation is determined based at least in part on a result of processing the determined behavior.

DETAILED DESCRIPTION

Examples and aspects are discussed below with reference to the figures. However, it should be understood that the detailed description given herein with respect to these figures is for explanatory purposes only, and not by way of limitation.

Figure 1:
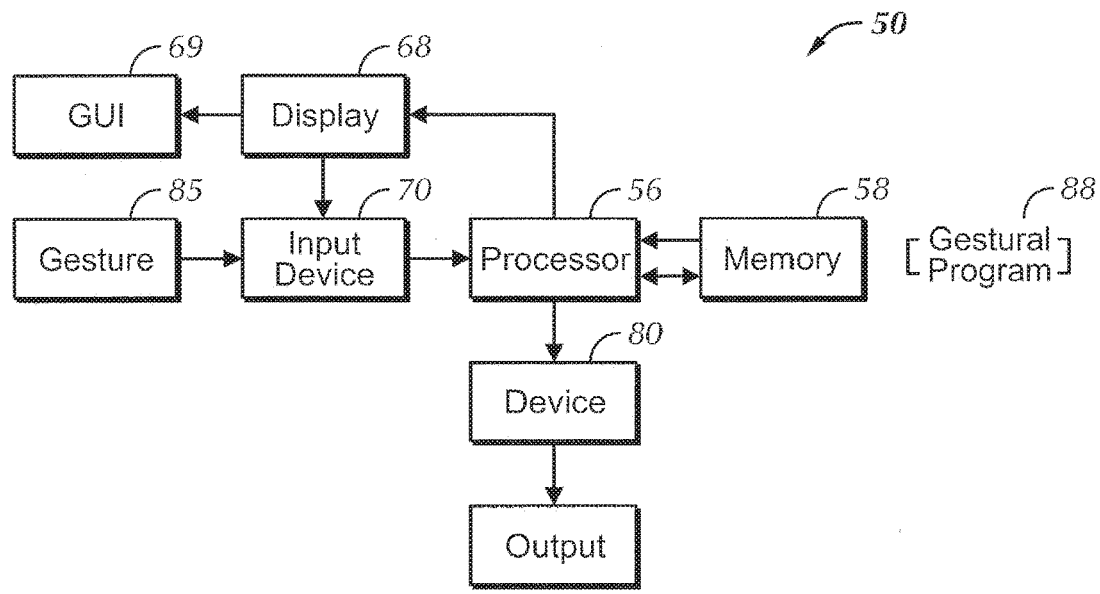
FIG. 1 is a block diagram of an exemplary touch-screen based computer system, in accordance with one embodiment of the present invention

FIG. 1 is a block diagram of an exemplary computer system 50, in accordance with one embodiment of the present invention. The computer system 50 may correspond to a personal computer system, such as a desktop computer system, a laptop computer system, a tablet computer system or a handheld computer system. The computer system may also correspond to a computing device, such as a cell phone, PDA, dedicated media player, consumer electronic device, and the like.

The exemplary computer system 50 shown in FIG. 1 includes a processor 56 configured to execute instructions and to carry out operations associated with the computer system 50. For example, using instructions retrieved for example from memory, the processor 56 may control the reception and manipulation of input and output data between components of the computing system 50. The processor 56 can be implemented on a single-chip, multiple chips or multiple electrical components. For example, various architectures can be used for the processor 56, including dedicated or embedded processor, single purpose processor, controller, ASIC, and so forth.

In most cases, the processor 56 together with an operating system operates to execute computer code and produce and use data. Operating systems are generally well known and will not be described in greater detail. By way of example, the operating system may correspond to OS/2, DOS, Unix, Linux, Palm OS, and the like. The operating system can also be a special purpose operating system, such as may be used for limited purpose appliance-type computing devices. The operating system, other computer code and data may reside within a memory block 58 that is operatively coupled to the processor 56. Memory block 58 generally provides a place to store computer code and data that are used by the computer system 50. By way of example, the memory block 58 may include Read-Only Memory (ROM), Random-Access Memory (RAM), hard disk drive and/or the like. The information could also reside on a removable storage medium and loaded or installed onto the computer system 50 when needed. Removable storage mediums include, for example, CD-ROM, PC-CARD, memory card, floppy disk, magnetic tape, and a network component.

The computer system 50 also includes a display device 68 that is operatively coupled to the processor 56. The display device 68 may be a liquid crystal display (LCD) (e.g., active matrix, passive matrix and the like). Alternatively, the display device 68 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 68 is generally configured to display a graphical user interface (GUI) 69 that provides an easy to use interface between a user of the computer system and the operating system or application running thereon. Generally speaking, the GUI 69 represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI 69 can additionally or alternatively display information, such as non interactive text and graphics, for the user on the display device 68.

The computer system 50 also includes an input device 70 that is operatively coupled to the processor 56. The input device 70 is configured to transfer data from the outside world into the computer system 50. The input device 70 may for example be used to perform tracking and to make selections with respect to the GUI 69 on the display 68. The input device 70 may also be used to issue commands in the computer system 50. The input device 70 may include a touch sensing device configured to receive input from a user's touch and to send this information to the processor 56. By way of example, the touch-sensing device may correspond to a touchpad or a touch screen. In many cases, the touch-sensing device recognizes touches, as well as the position and magnitude of touches on a touch sensitive surface. The touch sensing means reports the touches to the processor 56 and the processor 56 interprets the touches in accordance with its programming. For example, the processor 56 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

The input device 70 may be a touch screen that is positioned over or in front of the display 68. The touch screen 70 may be integrated with the display device 68 or it may be a separate component. The touch screen 70 has several advantages over other input technologies such as touchpads, mice, etc. For one, the touch screen 70 is positioned in front of the display 68 and therefore the user can manipulate the GUI 69 directly. For example, the user can simply place their finger over an object to be controlled. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens. In addition to being a touch screen, the input device 70 can be a multipoint input device. Multipoint input devices have advantages over conventional singlepoint devices in that they can distinguish more than one object (finger). Singlepoint devices are simply incapable of distinguishing multiple objects. By way of example, a multipoint touch screen, which can be used herein, is shown and described in greater detail in copending and commonly assigned U.S. patent application Ser. No. 10/840,862, which is hereby incorporated herein by reference.

The computer system 50 also includes capabilities for coupling to one or more I/O devices 80. By way of example, the I/O devices 80 may correspond to keyboards, printers, scanners, cameras, speakers, and/or the like. The I/O devices 80 may be integrated with the computer system 50 or they may be separate components (e.g., peripheral devices). In some cases, the I/O devices 80 may be connected to the computer system 50 through wired connections (e.g., cables/ports). In other cases, the I/O devices 80 may be connected to the computer system 80 through wireless connections. By way of example, the data link may correspond to PS/2, USB, IR, RF, Bluetooth or the like.

Particular processing within a touch-screen based computer is now described, where the processing accomplishes execution of an application as well as providing a display on the touch screen of the computer. The display processing includes providing a composite display that has characteristics based on the application display as well as characteristics relative to a virtual input device. The virtual input device display includes at least an input portion, to receive appropriate touch input to the touch screen relative to the displayed input device, for a user to interact with the virtual input device. The user interaction with the virtual input device includes activating portions of the virtual input device to provide user input to affect the application processing. The virtual input device (i.e., processing on the computer to accomplish the virtual input device) processes the user interaction and, based on the processing, provides the corresponding user input to the application.

The virtual input device display is typically highly correlated to the virtual input device processing of user interaction with the virtual input device. For example, if the virtual input device is a virtual keyboard, the virtual input device display may include a graphic representation of the keys of a typical QWERTY keyboard, whereas virtual input device processing of user interaction with the virtual keyboard includes determining which virtual keys have been activated by the user and providing corresponding input (e.g., letters and/or numbers) to the application.

Figure 2:
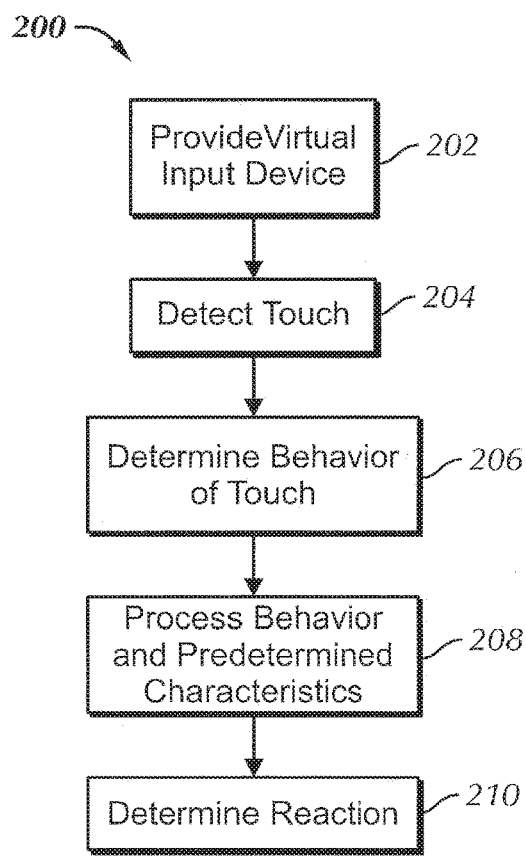
FIG. 2 is a flow chart broadly illustrating a method by which behavior of a user's touch, with respect to a virtual input device displayed on a touch screen of a multipoint sensing device, is processed to affect a reaction to the user's touch.

We now turn to FIG. 2, which is a flow chart illustrating a broad aspect of the invention. In particular, the FIG. 2 flow chart broadly illustrates a method by which behavior of a user's touch, with respect to a virtual input device displayed on a touch screen of a multipoint sensing device, is processed to affect a reaction to the user's touch. At step 202, the virtual input device is provided on the touch screen. The virtual input device may be, for example, a virtual QWERTY-style keyboard or other input device having virtual keys.

At step 204, a user's touch on the multipoint sensing device, to nominally activate a virtual key, is detected. Detecting a user's touch may be conventional. At step 206, the "behavior" of the user's touch is determined. The behavior is typically determined by processing signals created by the multipoint sensing device in response to the user's touch. Behaviors may be, for example, in the spatial domain (i.e., where on the multipoint sensing device the user touched to nominally activate the virtual key) or in the time domain (i.e., with what timing the user touched the multipoint sensing device to nominally activate the virtual key) and a combination of both spatial and time domain.

At step 208, the determined behavior and predetermined characteristics associated with the nominally-activated virtual key are processed. At step 210, based on the processing in step 208, a reaction is determined to activation of the nominally-activated virtual key. Examples of predetermined characteristics are illustrated later in this description. Broadly speaking, however, the predetermined characteristics for a virtual key are characteristics associated with particular behaviors or ranges of behaviors of a user's touch to nominally activate that virtual key.

Figure 3:
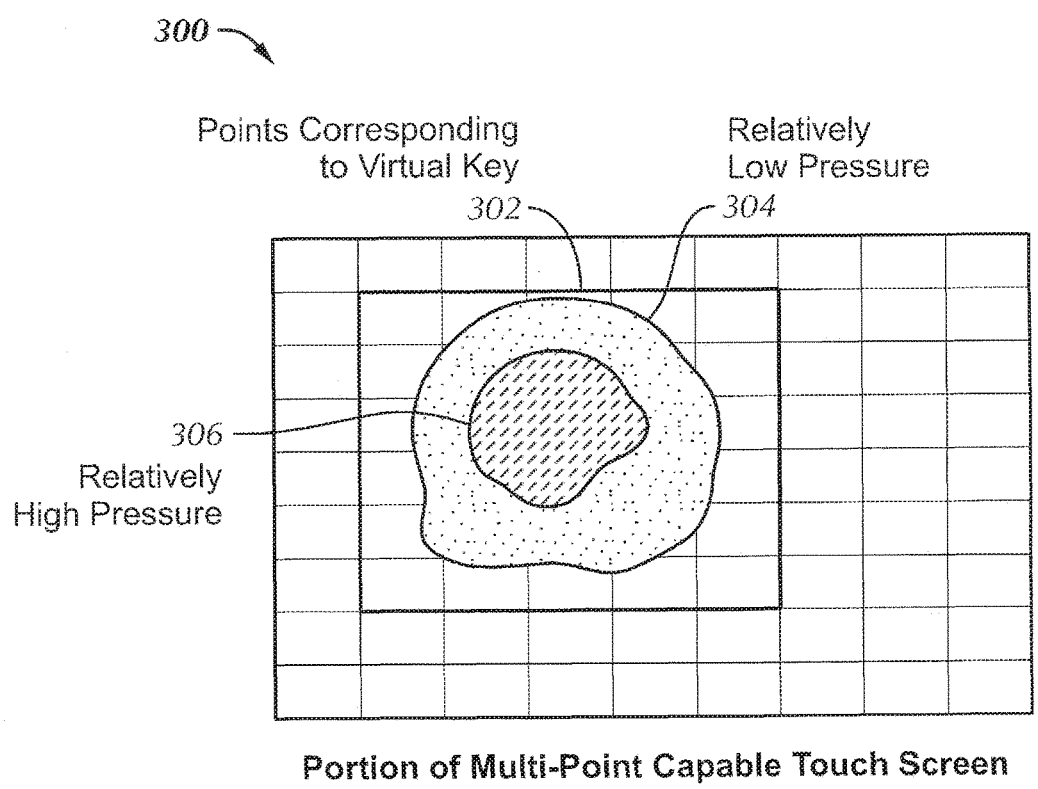
FIG. 3 illustrates using processing signals created by the multipoint sensing device in response to the user's touch in order to infer the pressure with which the user's touched the touch screen to activate a nominally-activated virtual key.

FIG. 3 illustrates using processing signals created by the multipoint sensing device in response to the user's touch in order to infer the pressure with which the user's touched the touch screen to activate a nominally-activated virtual key. Such processing is useful in the case where a pressure signal is not directly available from the touch screen, or to supplement a pressure signal that is directly available from the touch screen. The area 302 represents points on the touch screen that correspond to a particular virtual key. While the area 302 is a square, virtual keys need not be limited to being a particular shape.

Area 306 indicates (in a spatial domain) points on a touch screen that a user touched to nominally activate the virtual key of area 302. Similarly, area 304 indicates points on the touch screen that a user touched to nominally activate the virtual key of area 302. Which points are touched may be determined, for example, from the processing signals created by the multipoint sensing device in response to the user's touch.

Since area 304 encompasses more points than area 306, the touch corresponding to area 304 was with greater pressure than the touch corresponding to area 306. Furthermore, an indication of the actual pressure with which a virtual key is nominally activated may be inferred from the area corresponding to the user's touch.

While FIG. 3 illustrates all of the points within areas 304 and 306 fall within the area 302, this need not necessarily be the case. Furthermore, while FIG. 3 illustrates using the user's behavior in the spatial domain to infer pressure with which a virtual key is nominally activated, in some examples, the user's behavior in the time domain may be used to infer pressure with which a virtual key is nominally activated. In other examples, a combination of the user's behavior in the spatial domain and the time domain may be used to infer pressure with which a virtual key is nominally activated.

Having described one particular example of behavior of a user's touch of a touch screen to nominally activate a virtual key, we now describe one example of processing to process the determined behavior with which the user nominally activates a virtual key and predetermined characteristics for the nominally-activated virtual key.

Figures 4, 5:
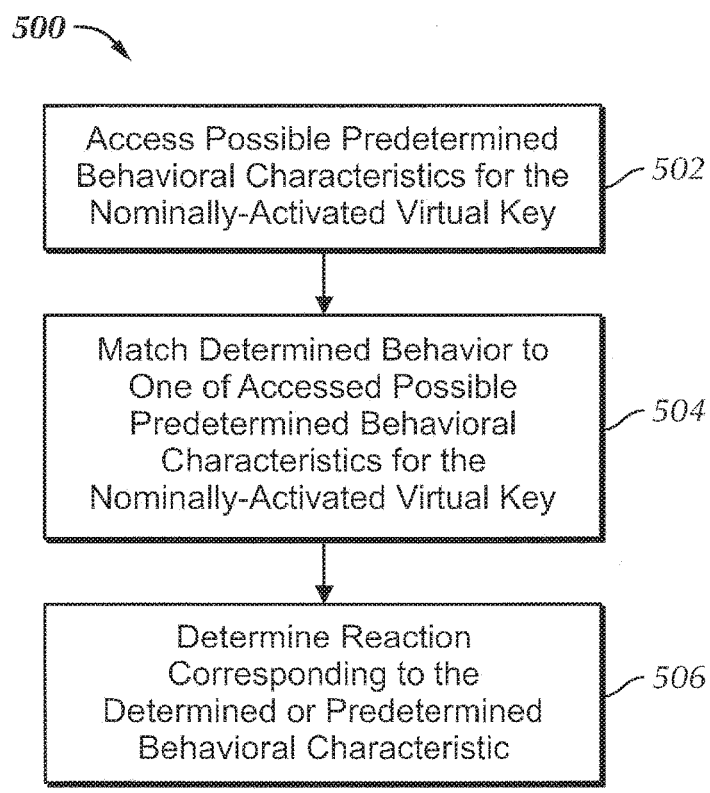
FIG. 4 illustrates a table data structure useable to determine reactions based on matching predetermined behavioral characteristics to actual behavioral characteristics with respect to nominally-activating particular virtual keys.
FIG. 5 is a flowchart illustrating an example of processing to determine a reaction with respect to particular user behavior.

Referring to FIG. 4, this figure illustrates a table in which each row is for a different one of a plurality of virtual keys. For example, row 408 is for one virtual key; row 410 is for another virtual key; and row 412 is for yet another virtual key. Column 402 includes indications of the virtual keys. Column 404 includes indications of predetermined behavioral characteristics for the virtual keys.

The predetermined behavioral characteristics are discussed in detail later. Broadly speaking, the predetermined behavioral characteristics are predetermined values of user's behavior (for example, specific values or ranges of values) in the spatial domain, the time domain or both. Using the FIG. 3 example, predetermined behavioral characteristics indicated in column 404 may include, for example, specific values of inferred pressure of a user's touch of a touch screen to nominally activate a virtual key indicated in column 402. As another example, the predetermined characteristics indicated in column 404 may include ranges of values of inferred pressure of a user's touch of the touch screen to nominally activate a virtual key indicated in column 402.

The column 406 includes indications of reactions corresponding to the predetermined characteristics indicated in column 404. That is, each reaction indicated in column 406 is an action to be taken (or, in some cases, not taken) when a determined behavior is matched to a particular predetermined behavioral characteristic in column 404.

An example of processing to determine a reaction with respect to particular user behavior is now described with reference to the flowchart in FIG. 5. For ease of illustration, the operation of the FIG. 5 example is discussed with respect to the FIG. 4 table, and with respect to a particular nominally-activated key, although the method illustrated in the FIG. 5 flowchart is not limited to being used with respect to a data structure of the form shown in FIG. 4.

Turning now to FIG. 5, at step 502, the possible predetermined behavioral characteristics in column 404 for the particular nominally-activated virtual key (in column 402) are accessed. For example, the particular nominally-activated key may be indicated in the entry where row 410 intersects with column 402. The accessed possible predetermined behavioral characteristics would then be within the rectangle 414.

At step 504, the determined behavior (i.e., the behavior of the user's touch in the spatial and/or time domain) is matched to the possible predetermined behavioral characteristics indicated in column 404. Then, in step 506, based on the matching, a reaction from column 406 is determined. Using the example of row 410, the determined reaction would be one of the reactions indicated within the rectangle 416.

Figures 6A, 6B:
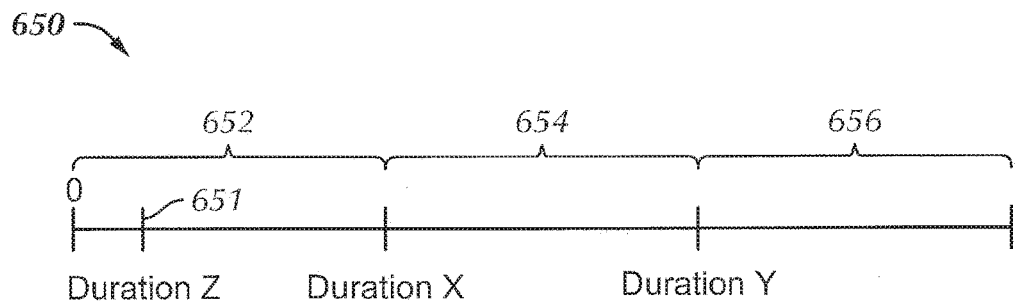
FIG. 6A illustrates a timeline corresponding to "durations" of user behavior in the temporal domain.
FIG. 6B illustrates a table data structure similar to the table illustrated in FIG. 4, to determine reactions based on user behaviors with respect to "durations" such as are illustrated in FIG. 6A.

We now discuss in greater detail, with reference to FIGS. 6A and 6B, what may be the predetermined behavioral characteristics indicated, for example, in column 404 of the FIG. 4 table and corresponding determined reactions. In the example of FIGS. 6A and 6B, the predetermined behavioral characteristics are in the time domain only and, specifically, are durations (here, ranges of durations) of the user's touch of the touch screen to nominally activate a virtual key.

FIG. 6A illustrates a timeline 650, with increasing duration from left to right. Various durations are indicated on the timeline, including "z", "x" and "y," from left to right. Reference numeral 651 indicates a duration less than "z." Reference numeral 652 indicates a duration greater than or equal to "z" and less than "x." Reference numeral 654 indicates a duration greater than or equal to "x" and less than "y." Finally, reference numeral 656 indicates a duration greater than or equal to "y."

FIG. 6B illustrates a portion of a table similar to the table illustrated in FIG. 4. The column 602 includes the entry for one particular nominally-activated virtual key. The column 604 includes entries for the predetermined behavioral characteristics. In the FIG. 6B example, the column 604 includes entries for the durations 651, 652, 654 and 656 denoted on the FIG. 6A timeline 650.

As discussed with reference to FIG. 5, the predetermined behavioral characteristics are matched to the determined behavior of the user's touch that nominally activates the virtual key. Based on the match, a reaction is determined. Column 606 of the FIG. 6B table portion includes indications of such reactions.

The reaction indications in column 606 are indicated by reference numerals 681, 682, 684 and 686; corresponding to the predetermined behavioral characteristics indicated by reference numerals 651, 652, 654 and 656. Referring to the specific reaction indications in column 606, the reaction indication 681 indicates that the nominally-activated virtual key is to not, in fact, be activated. That is, the duration of the touching is too short to indicate an actual activation of the virtual key. Similarly, the reaction indication 686 indicates that the nominally-activated virtual key is to not be actually activated. In this case, the duration of the touching is too long, presumably corresponding to a resting finger or hand part and not to an intentional activation.

The remaining reaction indications are the reaction indication 682 and the reaction indication 684. The reaction indication 682 indicates that the nominally-activated key is to be actually activated a single time. The reaction indication 684 indicates that the nominally-activated key is to be actually activated repeated times, with the number of times to repeat the actual activation a function of the duration of the touching.

FIG. 6A and FIG. 6B illustrate a simple example of determining reactions based on a determined behavior of the user in the time domain. As discussed above, reactions may be determined based on determined behaviors in the spatial domain, and based on a combination of determined behaviors in the spatial domain and in the time domain. The number and range of determined behaviors that may be used to determine reactions is limited, to some extent, only by what behavioral characteristics can be discerned or inferred.

A determined behavior in the spatial domain—inferred pressure—was discussed above with reference to FIG. 3. Other possible behaviors in the spatial domain include, for example, the area of the touch of a nominally-activated virtual key relative to the area of the touch of an adjacent such virtual key (i.e., there is not a "direct hit" of the user's finger in touching a virtual key). Possible behaviors that are in a combination of the spatial domain and the time domain are referred to, in some instances, as "gestures." See, for example, co-pending U.S. patent application Ser. No. 10/903,964, entitled GESTURES FOR TOUCH SENSITIVE INPUT DEVICES and filed Jul. 30, 2004.

Furthermore, the possible reactions, too, are somewhat limitless. Particularly where possible reactions are common possible reactions (such as, for example, a single activation or repeated activations), the reaction indication entry may be a link to a repository of such common possible reactions.

In some examples, the possible reactions and/or the predetermined behavioral characteristics may be user configurable, for example, using a menu or other utility. In some examples the possible reactions and/or the predetermined behavioral characteristics are automatically and dynamically configurable, based on the ongoing determined behavior of the user.

Figure 9:
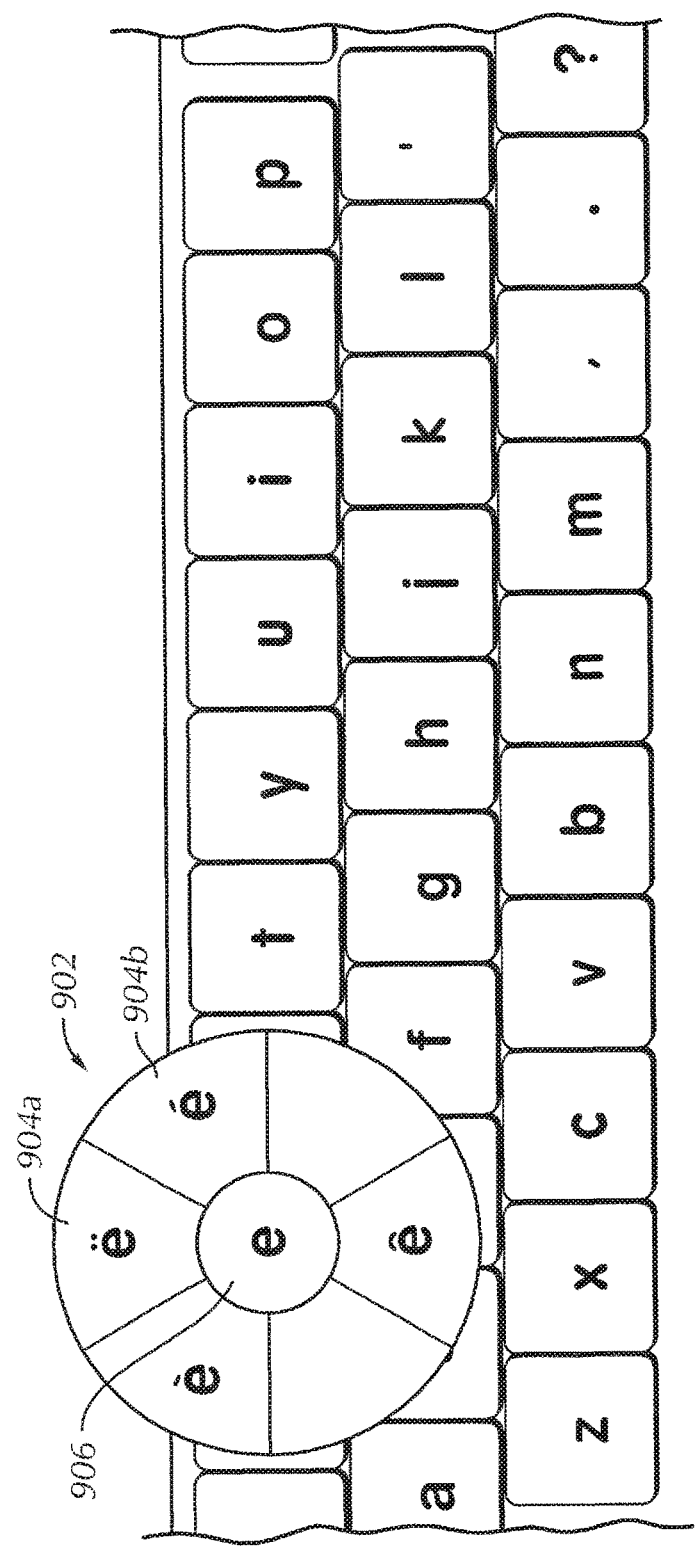
FIG. 9 illustrates a possible reaction to a nominal virtual key activation is display of a menu.

FIG. 9 illustrates a possible reaction is display of a menu 902. For example, the user may activate the "e" virtual key 906 with a particular behavior, and the reaction includes display of the menu 902. The menu 902, in the FIG. 9 illustration, includes additional virtual keys (e.g., 904a and 904b) corresponding to different forms of "e." In some examples, actual display of the menu 902 is bypassed based on particular behaviors, although the virtual keys of the menu 902 are still present and able to be activated. For example, the user may nominally activate the "e" virtual key 906 with a "brush" gesture toward the additional virtual key 904 that is desired to be activated. The user would know the location of the additional virtual keys 904 based, for example, on previous use operation of the virtual keyboard. Not displaying the menu 902, a shortcut is provided for activating the additional virtual keys 904.

Figures 7, 8:
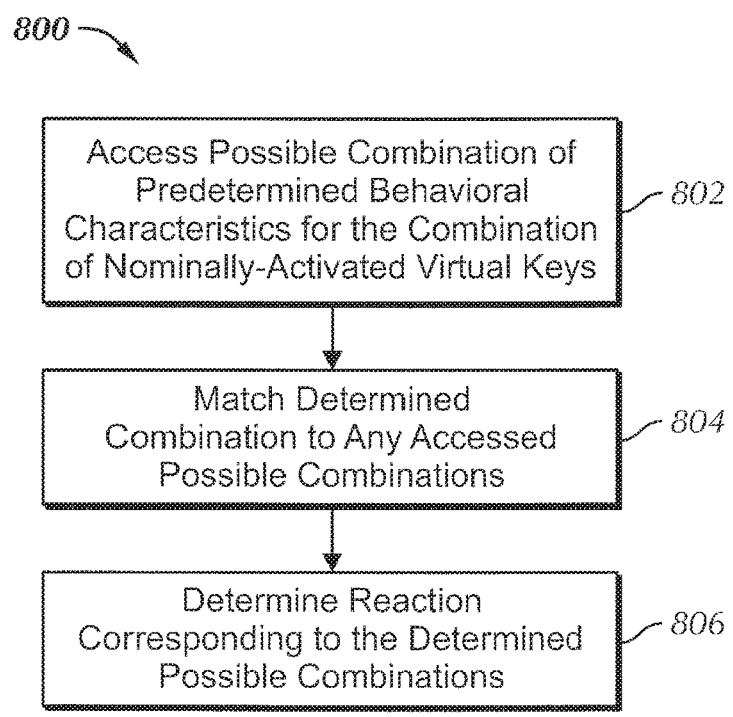
FIG. 7 illustrates a table structure for determining reactions based on user behavior with respect to nominally activating combinations of virtual keys.
FIG. 8 is a flow chart illustrating an example of processing to determine a reaction with respect to particular user behavior with respect to nominally activating combinations of virtual keys.

We now discuss, with reference to FIG. 7 and FIG. 8, an example where a combination of virtual keys is nominally activated. This example is similar in many ways to the example discussed above with reference to FIG. 5 and FIGS. 6A and 6B. Referring first to FIG. 7, the column 702 includes entries for combinations of nominally-activated virtual keys. For example, one such entry in column 702 may be for a virtual key corresponding to an "a" in combination with a virtual key corresponding to a "SHIFT."

Each single possible combination of nominally-activated keys need not have a separate entry in the column 702. Where the combinations of predetermined behavioral characteristics in column 704 and the possible reactions in column 706 have common characteristics for plural combinations of nominally-activated virtual keys, the entries in column 704 and/or column 706 may be common to the plural combinations of predetermined behavioral characteristics, and parameterized if necessary to accommodate unique attributes associated with particular ones of the combinations of nominally-activated virtual keys.

Typically, many combinations of virtual keys do not have corresponding entries, such combinations typically resulting from inadvertent touching of the combinations of virtual keys. For a combination that does not have a corresponding entry, there would be no reaction to the combination. As another example, the such combinations may have corresponding entries, and the reaction would be "no reaction" or a reaction to generate an alert (e.g., a "beep" or other alert) to the user.

Referring to FIG. 8, the flowchart 800 illustrates an example of processing to determine a reaction with respect to particular user behavior relative to a combination of nominally-activated virtual keys. While not so limited, the operation of the FIG. 8 processing is described with reference to the data structure illustrated in FIG. 7.

At step 802, the possible predetermined behavioral characteristics in column 704 for the particular combination of nominally-activated virtual keys (in column 702) are accessed. At step 804, the determined behavior (i.e., the behavior of the user's touch in the spatial and/or time domain) is matched to the possible predetermined behavioral characteristics indicated in column 704. Then, in step 806, based on the matching, a reaction from column 706 is determined.

Figure 10:
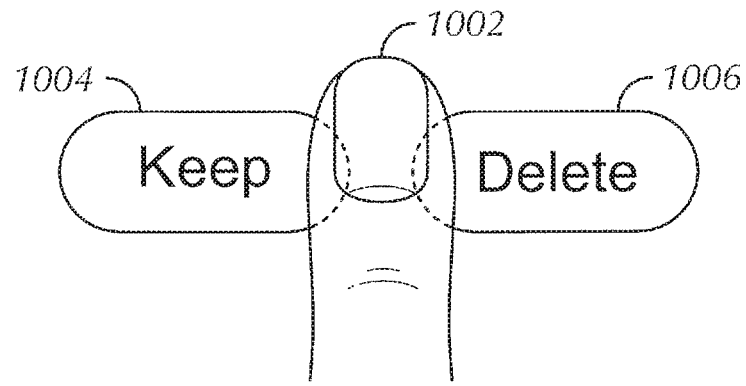
FIG. 10 illustrates an example of a display having GUI items that are not virtual keys.

FIG. 10 illustrates an example of a display having virtual GUI items that are not virtual keys of a virtual keyboard. The general concepts discussed above with the specific example of virtual keys of a virtual keyboard are generally applicable to virtual GUI items. For example, less pressure and/or shorter duration of touching (e.g., by a finger 1002) may be required to activate the "keep" virtual GUI item 1004 than to activate the "delete" virtual GUI item 1006. In addition, the processing may be such that activation of some GUI items (such as the "delete" GUI item, for example) require additional behavior, such as a "wiggle" or other gesture, which would serve as additional confirmation that it is intended for the GUI item to be activated.

In some examples, the combination is "registered" only upon a particular condition, such as one virtual key of the combination being released.

Figure 11:
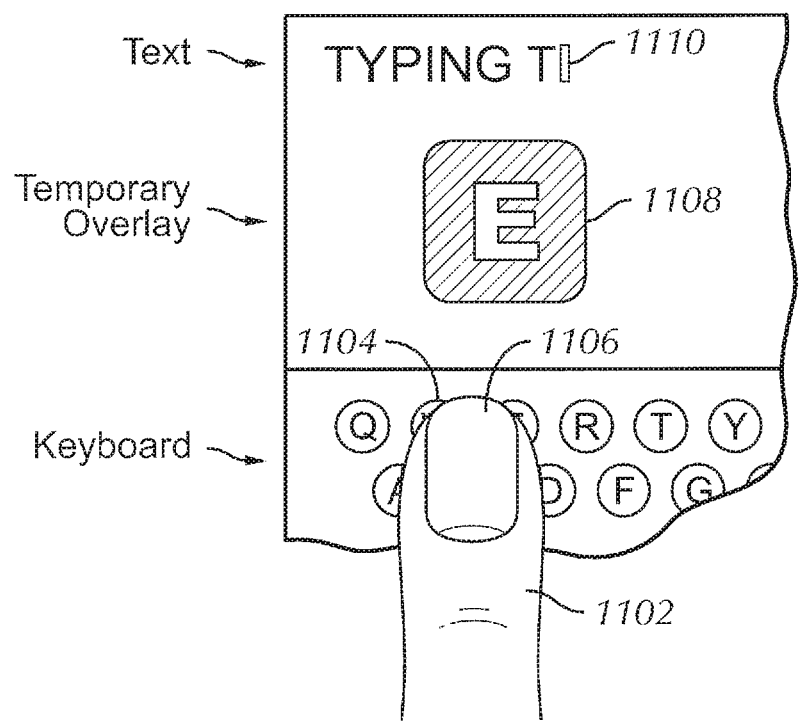
FIG. 11 illustrates a GUI including a virtual keyboard and feedback of a letter being activated.

In some examples, a "preview" function is provided. Thus, for example, before a virtual GUI item's activation is committed, an indication of the activation is displayed. This may be particularly useful, for example, where the virtual GUI items are particularly small. FIG. 11 illustrates a finger 1102 whose touch may be activating either the "w" virtual key or the "e" virtual key. The temporary overlay 1108 displays an indication that the "e" virtual key is to be activated, before the "e" virtual key activation is committed as typed text 1110. For example, the finger 1102 being lifted while a particular virtual key is indicated as being to be activated may cause the particular virtual key to actually be activated. In the FIG. 11 example, if the "e" virtual key is not to be activated, then the finger 1102 may be moved (e.g., without lifting it) on the touch screen to activate a different virtual key.

The various aspects, features, embodiments or implementations of the invention described above can be used alone or in various combinations. The invention is preferably implemented by software, but can also be implemented in hardware or a combination of hardware and software. The invention can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the disclosed advantages. As set forth above, one advantage of the invention is that how a touch screen computer reacts to a user's touch to a virtual keyboard provided on the touch screen can be based on a deep appreciation for the behavior with which the user touches the touch screen. Another advantage of the invention is that how the touch screen computer reacts to the user's touch can be highly configurable.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed:

1. A non-transitory computer-readable storage medium storing one or more programs, the one or more programs comprising instructions, which when executed by a device with a display and a touch-sensitive surface, wherein the device includes one or more sensors to detect pressure of contacts with the touch-sensitive surface, cause the electronic device to:

display, on the display, one or more user interface objects that are configured to be conditionally activated in response to inputs detected on the touch-sensitive surface;

while displaying the one or more user interface objects on the display, detect a first input that includes a first contact on the touch-sensitive surface at a location that corresponds to a first user interface object of the one or more user interface objects, wherein the first contact has a duration and a pressure; and in response to detecting the first input:

in accordance with a determination that the first input satisfies a respective input threshold without satisfying first activation criteria, perform a first operation associated with the first user interface object without performing a second operation associated with the first user interface object; and in accordance with a determination that the first input satisfies the first activation criteria for the first user interface object, wherein the first activation criteria for the first user interface object include a combination of pressure criteria and temporal criteria that are evaluated by comparing the duration of the first contact with one or more temporal thresholds and comparing the pressure of the first contact with one or more pressure thresholds, perform the second operation associated with the first user interface object, wherein the duration of the first contact is a duration that the first contact has been detected on the touch-sensitive surface starting from a time prior to when the first input satisfied the respective input threshold, and wherein the second operation is different from the first operation.

2. The non-transitory computer-readable storage medium of claim 1, wherein the temporal criteria include a criterion that is met when the duration of the contact is below a respective temporal threshold of the one or more temporal thresholds.

3. The non-transitory computer-readable storage medium of claim 1, wherein the temporal criteria include a criterion that is met when the duration of the contact is above a respective temporal threshold of the one or more temporal thresholds.

4. The non-transitory computer-readable storage medium of claim 1, wherein the temporal criteria include a criterion that is met when the duration of the contact is within a temporal range bounded by two temporal thresholds of the one or more temporal thresholds.

5. The non-transitory computer-readable storage medium of claim 1, wherein the pressure criteria include a criterion that is met when the pressure of the contact is below a respective pressure threshold of the one or more pressure thresholds.

6. The non-transitory computer-readable storage medium of claim 1, wherein the pressure criteria include a criterion that is met when the pressure of the contact is above a respective pressure threshold of the one or more pressure thresholds.

7. The non-transitory computer-readable storage medium of claim 1, wherein the pressure criteria include a criterion that is met when the pressure of the contact is within a pressure range bounded by two pressure thresholds of the one or more pressure thresholds.

8. The non-transitory computer-readable storage medium of claim 1, wherein the non-transitory computer-readable storage medium further comprises instructions, which when executed by the one or more processors of the electronic device, cause the device to:

while displaying the one or more user interface objects on the display, detect a second input that includes a second contact on the touch-sensitive surface at a location that corresponds to a second user interface object of the one or more user interface objects, wherein the second contact has a duration and a pressure; and in response to detecting the second input:

in accordance with a determination that the second input satisfies second activation criteria for the second user interface object that are different from the first activation criteria for the first user interface object, wherein the second activation criteria for the second user interface object include a combination of pressure criteria and temporal criteria that are evaluated by comparing the duration of the second contact with one or more temporal thresholds and comparing the pressure of the second contact with one or more pressure thresholds, including a pressure threshold that is lower than the respective pressure threshold at which the pressure criteria for the first user interface object are satisfied, perform a respective operation associated with the second user interface object; and in accordance with a determination that the second input does not satisfy the second activation criteria, forgo performance of the respective operation associated with the second user interface object.

9. The non-transitory computer-readable storage medium of claim 1, wherein the second operation associated with the first user interface object includes displaying, proximate to the first user interface object, a menu with a plurality of options that are associated with the first user interface object.

10. The non-transitory computer-readable storage medium of claim 1, wherein the second operation associated with the first user interface object includes displaying, an overlay that includes an expanded view of content of the first user interface object.

11. A method, comprising:

at a device with a display and a touch-sensitive surface, wherein the device includes one or more sensors to detect pressure of contacts with the touch-sensitive surface:

displaying, on the display, one or more user interface objects that are configured to be conditionally activated in response to inputs detected on the touch-sensitive surface;

while displaying the one or more user interface objects on the display, detecting a first input that includes a first contact on the touch-sensitive surface at a location that corresponds to a first user interface object of the one or more user interface objects, wherein the first contact has a duration and a pressure; and in response to detecting the first input:

in accordance with a determination that the first input satisfies a respective input threshold without satisfying first activation criteria, performing a first operation associated with the first user interface object without performing a second operation associated with the first user interface object; and in accordance with a determination that the first input satisfies the first activation criteria for the first user interface object, wherein the first activation criteria for the first user interface object include a combination of pressure criteria and temporal criteria that are evaluated by comparing the duration of the first contact with one or more temporal thresholds and comparing the pressure of the first contact with one or more pressure thresholds, performing the second operation associated with the first user interface object, wherein the duration of the first contact is a duration that the first contact has been detected on the touch-sensitive surface starting from a time prior to when the first input satisfied the respective input threshold, and wherein the second operation is different from the first operation.

12. The method of claim 11, wherein the temporal criteria include a criterion that is met when the duration of the contact is below a respective temporal threshold of the one or more temporal thresholds.

13. The method of claim 11, wherein the temporal criteria include a criterion that is met when the duration of the contact is above a respective temporal threshold of the one or more temporal thresholds.

14. The method of claim 11, wherein the temporal criteria include a criterion that is met when the duration of the contact is within a temporal range bounded by two temporal thresholds of the one or more temporal thresholds.

15. The method of claim 11, wherein the pressure criteria include a criterion that is met when the pressure of the contact is below a respective pressure threshold of the one or more pressure thresholds.

16. The method of claim 11, wherein the pressure criteria include a criterion that is met when the pressure of the contact is above a respective pressure threshold of the one or more pressure thresholds.

17. The method of claim 11, wherein the pressure criteria include a criterion that is met when the pressure of the contact is within a pressure range bounded by two pressure thresholds of the one or more pressure thresholds.

18. The method of claim 11, further comprising:
while displaying the one or more user interface objects on the display, detecting a second input that includes a second contact on the touch-sensitive surface at a location that corresponds to a second user interface object of the one or more user interface objects, wherein the second contact has a duration and a pressure; and
in response to detecting the second input:
in accordance with a determination that the second input satisfies second activation criteria for the second user interface object that are different from the first activation criteria for the first user interface object, wherein the second activation criteria for the second user interface object include a combination of pressure criteria and temporal criteria that are evaluated by comparing the duration of the second contact with one or more temporal thresholds and comparing the pressure of the second contact with one or more pressure thresholds, including a pressure threshold that is lower than the respective pressure threshold at which the pressure criteria for the first user interface object are satisfied, performing a respective operation associated with the second user interface object; and
in accordance with a determination that the second input does not satisfy the second activation criteria, forgoing performance of the respective operation associated with the second user interface object.

19. The method of claim 11, wherein the second operation associated with the first user interface object includes displaying, proximate to the first user interface object, a menu with a plurality of options that are associated with the first user interface object.

20. The method of claim 11, wherein the second operation associated with the first user interface object includes displaying, an overlay that includes an expanded view of content of the first user interface object.

21. An electronic device, comprising:
a display;
a touch-sensitive surface;
one or more sensors configured to detect pressure of contacts with the touch-sensitive surface;
a processor;
a memory; and
one or more programs, wherein the one or more programs are stored in the memory and configured to be executed by the processor, the one or more programs including instructions for:
displaying, on the display, one or more user interface objects that are configured to be conditionally activated in response to inputs detected on the touch-sensitive surface;
while displaying the one or more user interface objects on the display, detecting a first input that includes a first contact on the touch-sensitive surface at a location that corresponds to a first user interface object of the one or more user interface objects, wherein the first contact has a duration and a pressure; and
in response to detecting the first input:
in accordance with a determination that the first input satisfies a respective input threshold without satisfying first activation criteria, performing a first operation associated with the first user interface object without performing a second operation associated with the first user interface object; and
in accordance with a determination that the first input satisfies the first activation criteria for the first user interface object, wherein the first activation criteria for the first user interface object include a combination of pressure criteria and temporal criteria that are evaluated by comparing the duration of the first contact with one or more temporal thresholds and comparing the pressure of the first contact with one or more pressure thresholds, performing the second operation associated with the first user interface object, wherein the duration of the first contact is a duration that the first contact has been detected on the touch-sensitive surface starting from a time prior to when the first input satisfied the respective input threshold, and wherein the second operation is different from the first operation.

22. The electronic device of claim 21, wherein the temporal criteria include a criterion that is met when the duration of the contact is below a respective temporal threshold of the one or more temporal thresholds.

23. The electronic device of claim 21, wherein the temporal criteria include a criterion that is met when the duration of the contact is above a respective temporal threshold of the one or more temporal thresholds.

24. The electronic device of claim 21, wherein the temporal criteria include a criterion that is met when the duration of the contact is within a temporal range bounded by two temporal thresholds of the one or more temporal thresholds.

25. The electronic device of claim 21, wherein the pressure criteria include a criterion that is met when the pressure of the contact is below a respective pressure threshold of the one or more pressure thresholds.

26. The electronic device of claim 21, wherein the pressure criteria include a criterion that is met when the pressure of the contact is above a respective pressure threshold of the one or more pressure thresholds.

27. The electronic device of claim 21, wherein the pressure criteria include a criterion that is met when the pressure of the contact is within a pressure range bounded by two pressure thresholds of the one or more pressure thresholds.

28. The electronic device of claim 21, the one or more programs further including instructions for:
while displaying the one or more user interface objects on the display, detecting a second input that includes a second contact on the touch-sensitive surface at a location that corresponds to a second user interface object of the one or more user interface objects, wherein the second contact has a duration and a pressure; and in response to detecting the second input:

in accordance with a determination that the second input satisfies second activation criteria for the second user interface object that are different from the first activation criteria for the first user interface object, wherein the second activation criteria for the second user interface object include a combination of pressure criteria and temporal criteria that are evaluated by comparing the duration of the second contact with one or more temporal thresholds and comparing the pressure of the second contact with one or more pressure thresholds, including a pressure threshold that is lower than the respective pressure threshold at which the pressure criteria for the first user interface object are satisfied, performing a respective operation associated with the second user interface object; and in accordance with a determination that the second input does not satisfy the second activation criteria, forgoing performance of the respective operation associated with the second user interface object.

29. The electronic device of claim 21, wherein the second operation associated with the first user interface object includes displaying, proximate to the first user interface object, a menu with a plurality of options that are associated with the first user interface object.

30. The electronic device of claim 21, wherein the second operation associated with the first user interface object includes displaying, an overlay that includes an expanded view of content of the first user interface object.

* * * * *